United States Patent
Kitsutaka

(10) Patent No.: US 6,828,969 B2
(45) Date of Patent: Dec. 7, 2004

(54) GAME SYSTEM, PROGRAM AND IMAGE GENERATING METHOD

(75) Inventor: Shigeru Kitsutaka, Kawasaki (JP)

(73) Assignee: Namco Ltd., Tokyo (JP)

( * ) Notice: Subject to any disclaimer, the term of this patent is extended or adjusted under 35 U.S.C. 154(b) by 312 days.

(21) Appl. No.: 10/048,224

(22) PCT Filed: Jun. 4, 2001

(86) PCT No.: PCT/JP01/04699

§ 371 (c)(1),
(2), (4) Date: Feb. 19, 2002

(65) Prior Publication Data

US 2002/0163519 A1 Nov. 7, 2002

(30) Foreign Application Priority Data

Jun. 5, 2000 (JP) ........................................ 2000-167504

(51) Int. Cl.[7] .............................................. G06T 11/20
(52) U.S. Cl. ...................... 345/441; 345/440; 345/419; 345/422; 345/582; 345/473
(58) Field of Search ................................. 345/440, 441, 345/582, 419, 422, 473

(56) References Cited

U.S. PATENT DOCUMENTS

| | | | | |
|---|---|---|---|---|
| 5,265,198 A | * | 11/1993 | Gonzalez-Lopez et al. | 345/422 |
| 5,341,462 A | * | 8/1994 | Obata | 345/422 |
| 5,838,329 A | * | 11/1998 | Day | 345/426 |
| 6,151,026 A | * | 11/2000 | Iwade et al. | 345/420 |

FOREIGN PATENT DOCUMENTS

| | | |
|---|---|---|
| JP | A 7-85310 | 3/1995 |
| JP | A 8-279057 | 10/1996 |
| JP | A 9-311954 | 12/1997 |
| JP | A 2000-149062 | 5/2000 |

* cited by examiner

*Primary Examiner*—Kee M. Tung
*Assistant Examiner*—Po Wei Chen
(74) *Attorney, Agent, or Firm*—Oliff & Berridge, PLC

(57) ABSTRACT

A game system, program and image generating method which can effectively generate an image of an edge line in a more natural manner are provided. The image of an edge line EDL of an object OB is drawn in an inside area of an edge of the object OB. The object is translucent-synthesized with the edge line with a translucency determined depending on the distance from the viewpoint or the size of the perspectively transformed object. A Z-value of the object in a position where the edge line is to be drawn is set as the Z-value of the edge line. A mapping image is mapped on a virtual polygon through the bi-linear filtering method while shifting a texture coordinate in the first or second direction, thereby drawing the edge line of the object. A virtual polygon is generated such that it encloses the image of the perspectively transformed object and has a size variable depending on the size of the perspectively transformed object. An alpha value set in the inside area of the edge of the object is different from an alpha value set in the outside area thereof. The edge line region in the inside area of the edge of the object is detected based on the alpha value that has been subjected to the texel interpolation.

27 Claims, 35 Drawing Sheets

FIG. 3
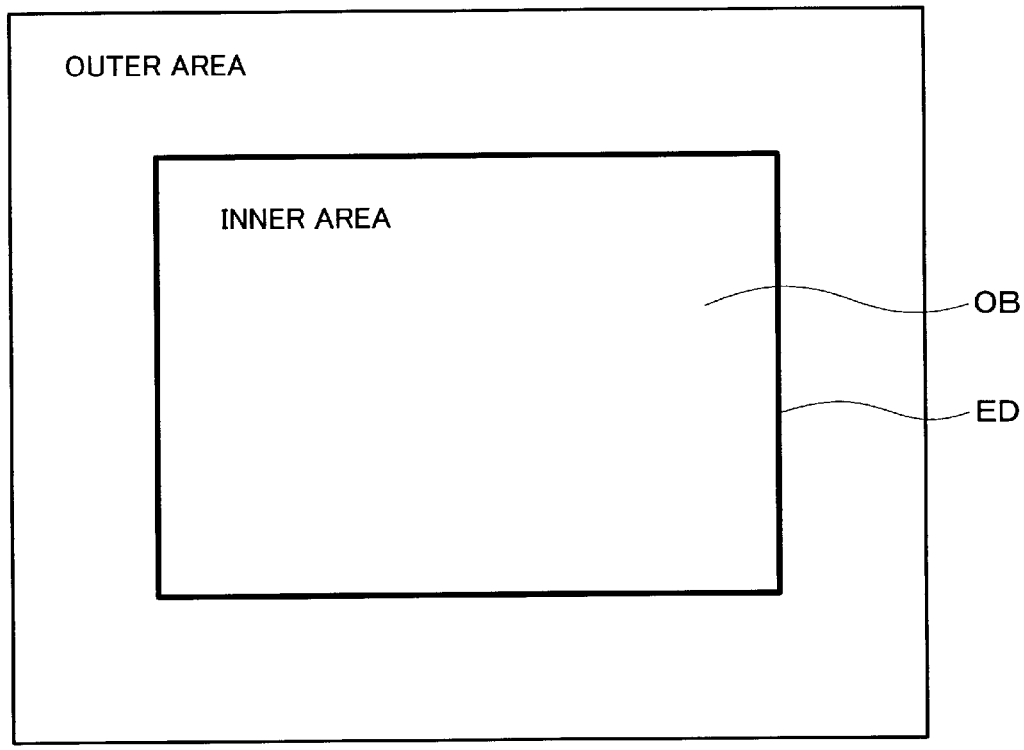
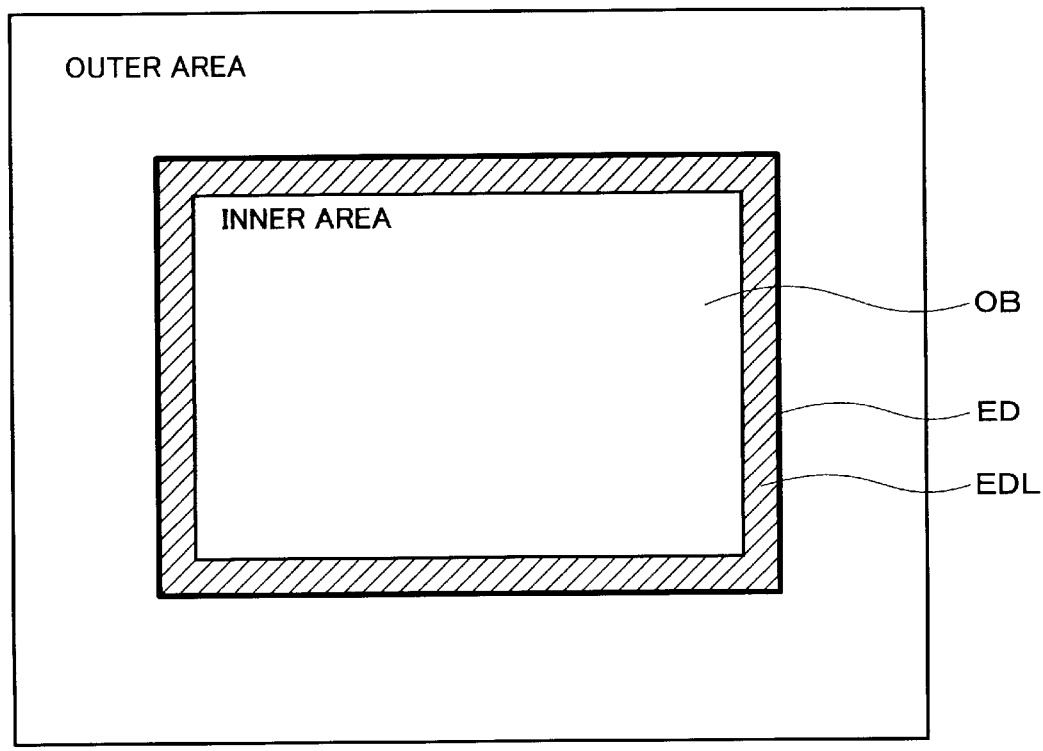
DRAW EDGE LINE IN INNER AREA

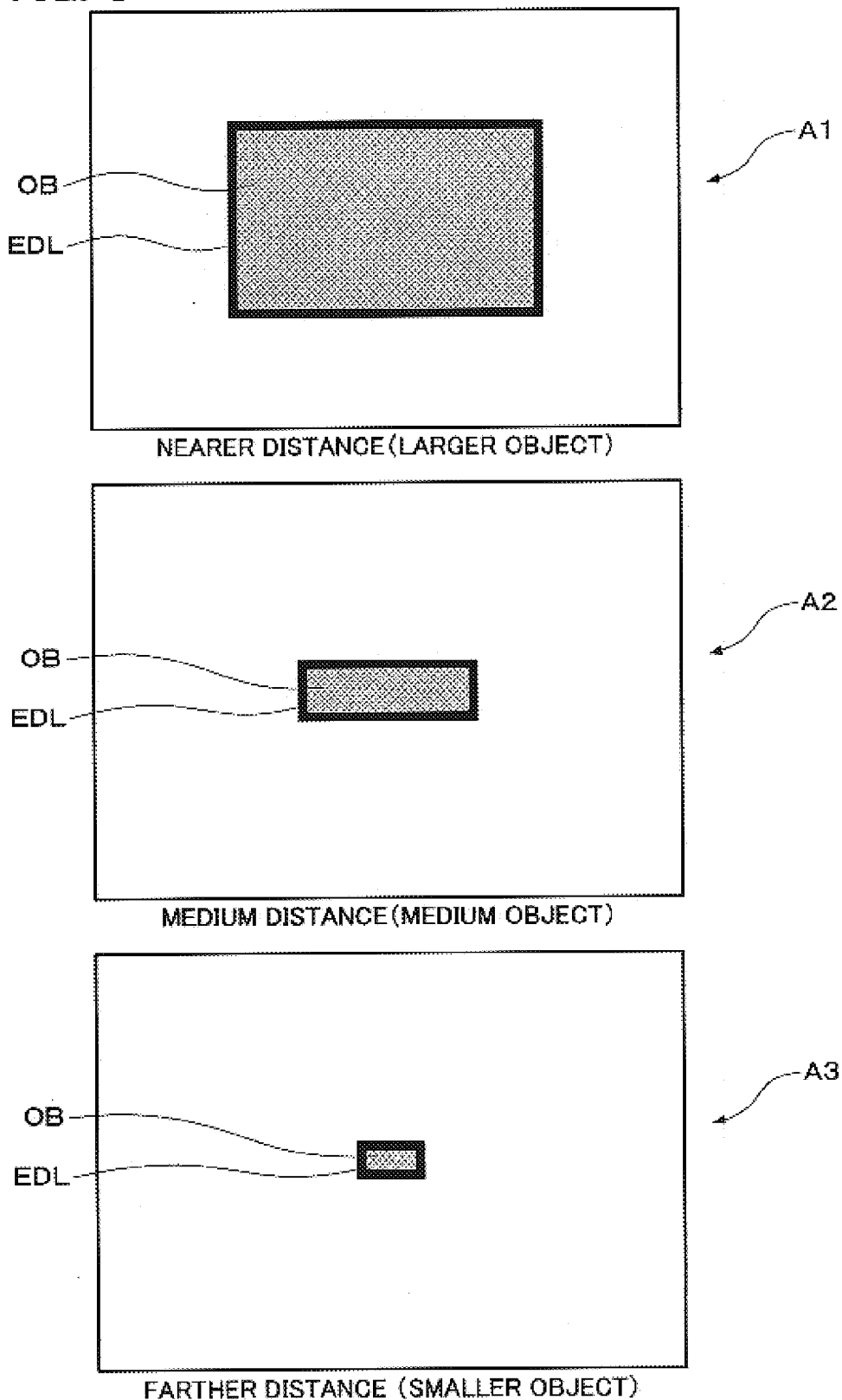

FIG. 13A MAPPING IMAGE
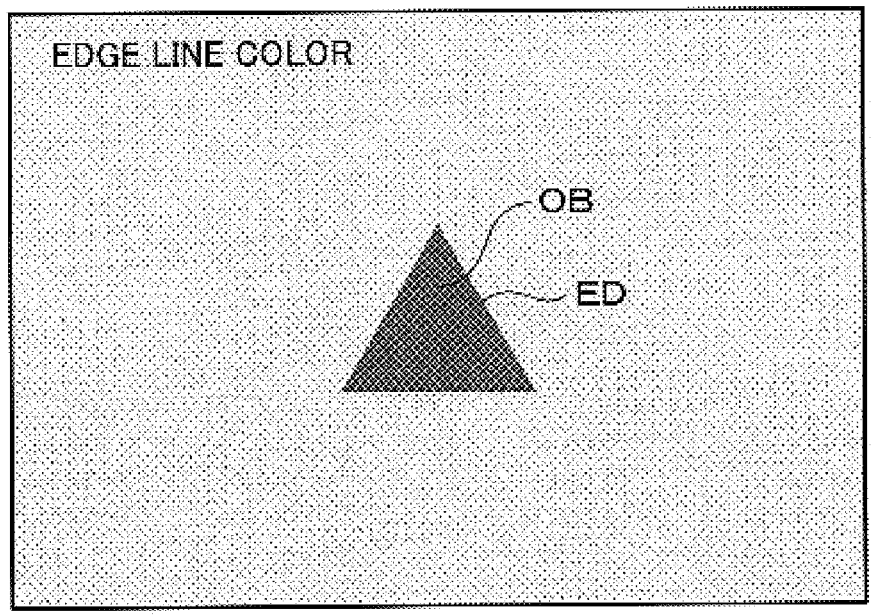
FIG. 13B
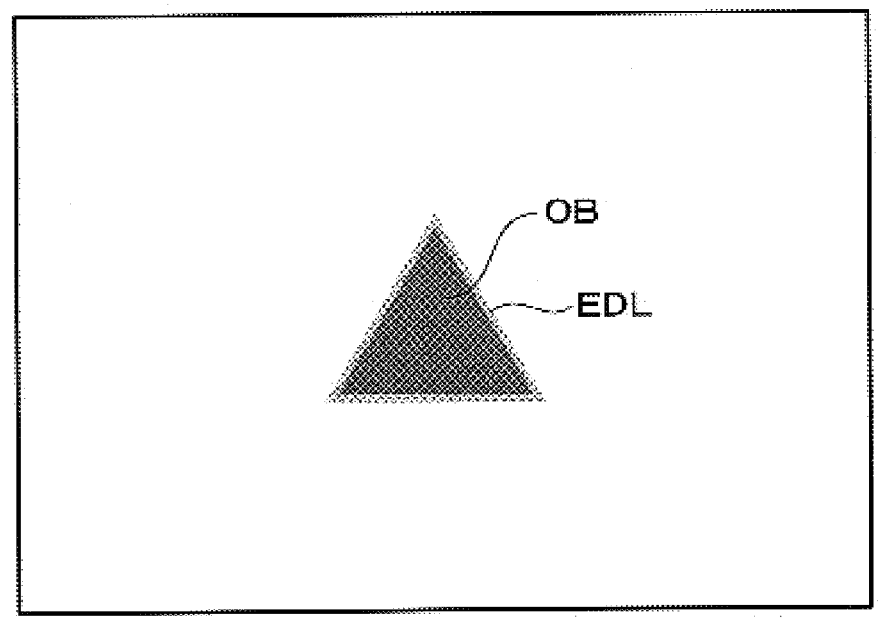

FIG. 16A DISTANCE FROM VIEWPOINT IS NEARER
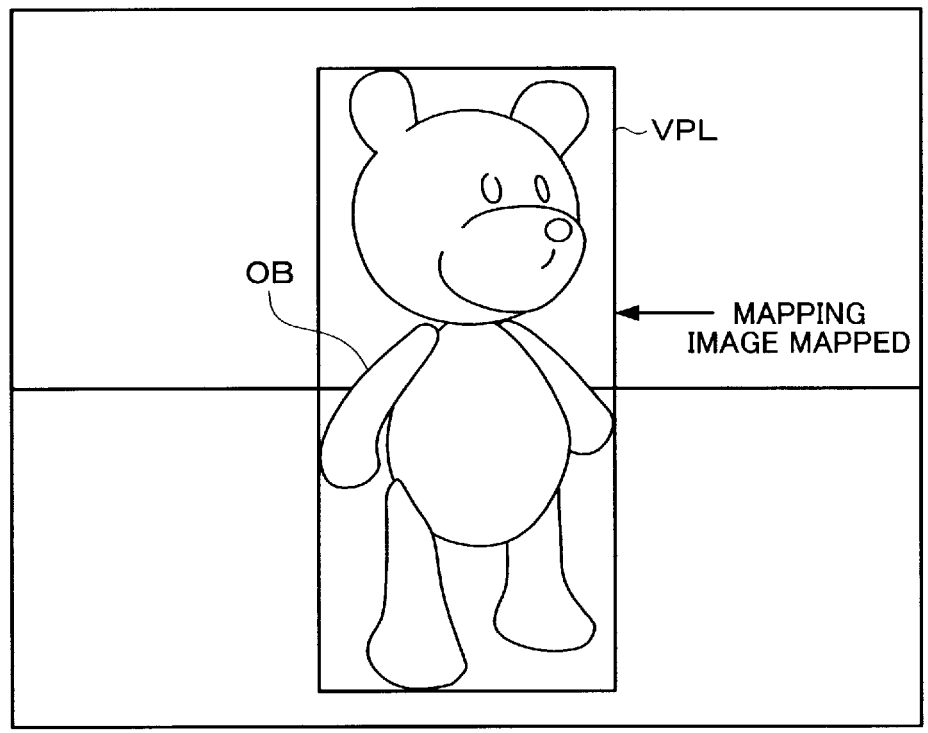
FIG. 16B DISTANCE FROM VIEWPOINT IS FARTHER
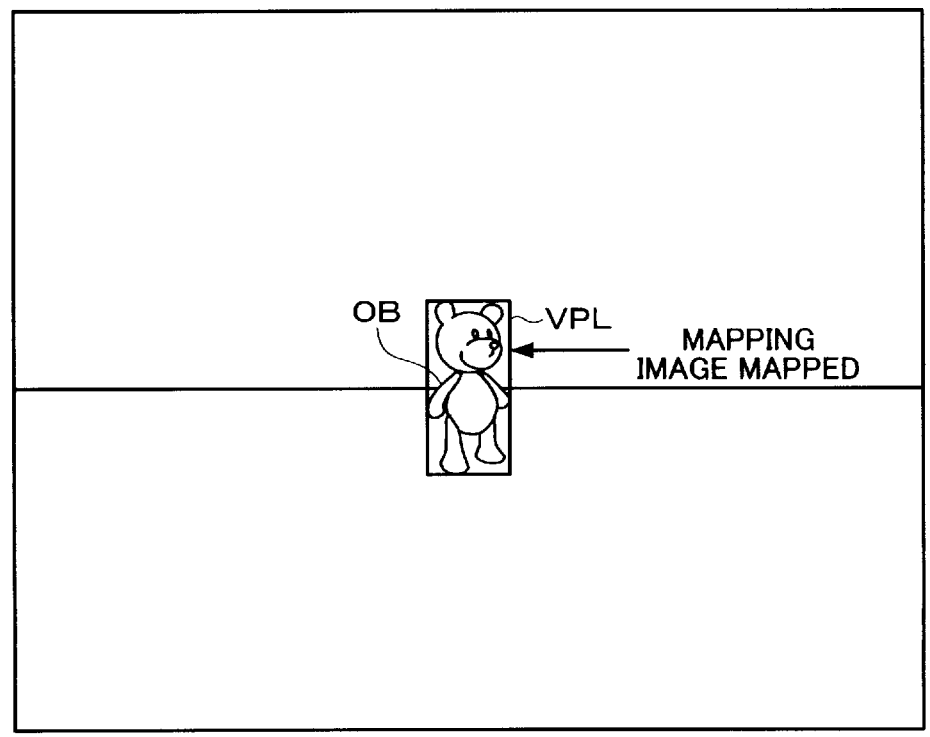

FIG. 17A  DISTANCE FROM VIEWPOINT IS NEARER
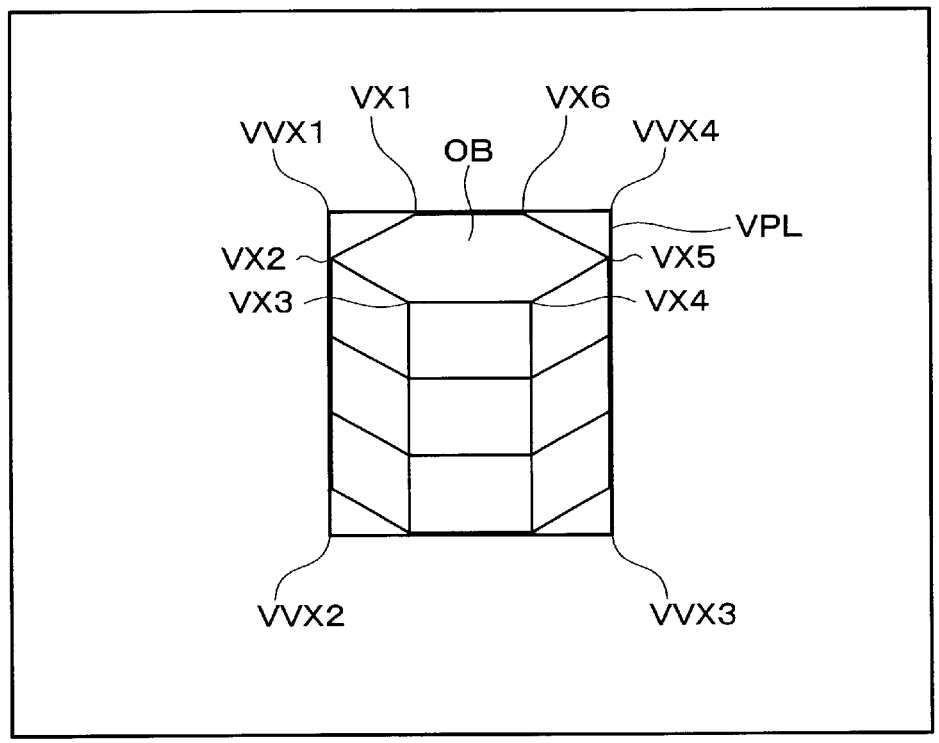
FIG. 17B  DISTANCE FROM VIEWPOINT IS FARTHER
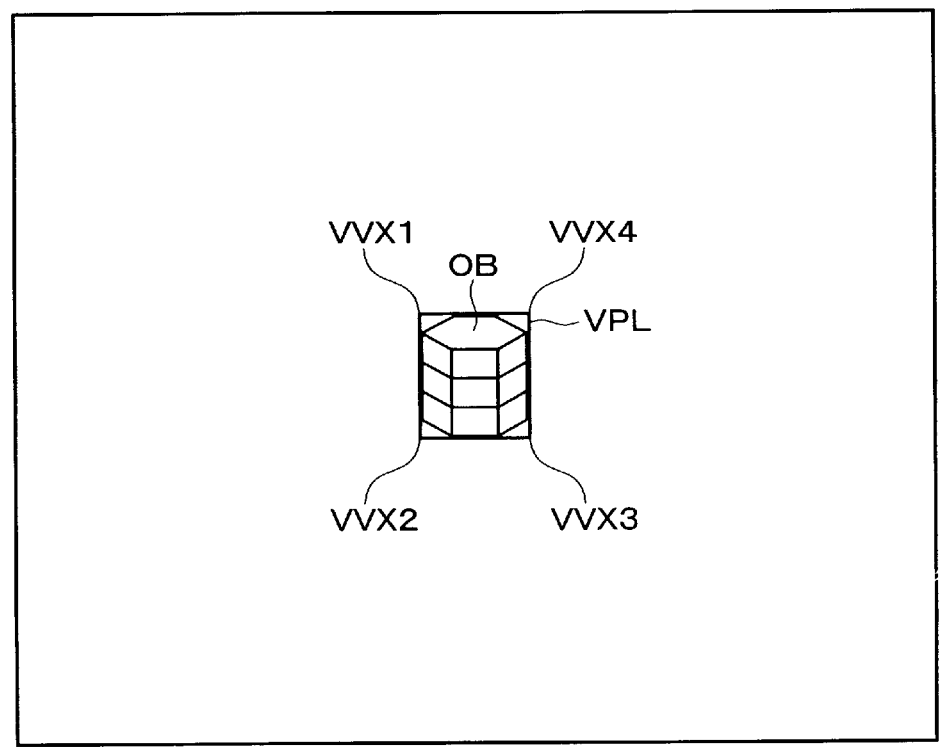

FIG. 22
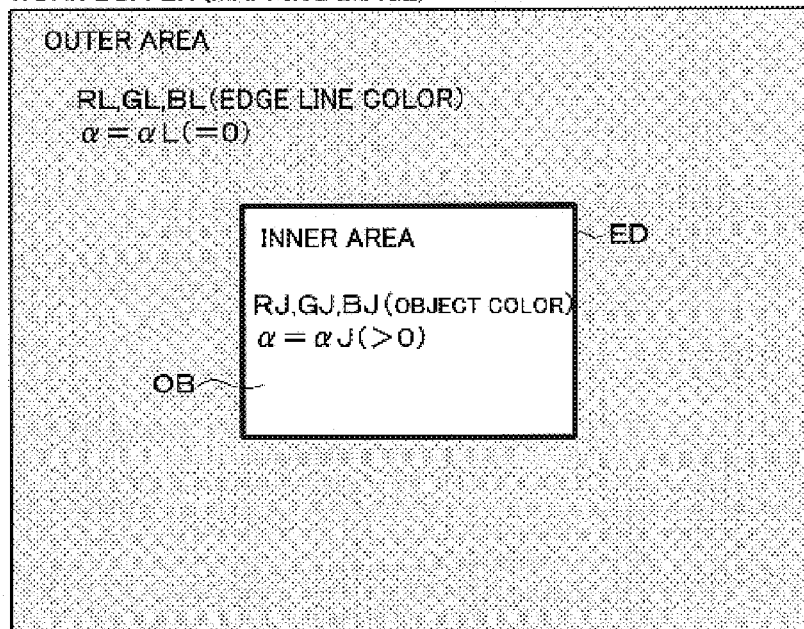
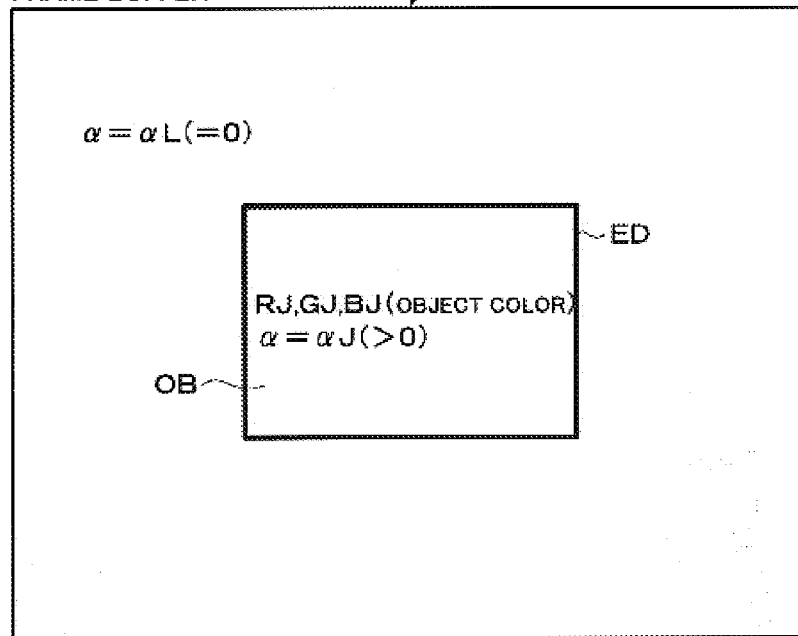

$R = (RA+RB+RC+RD)/4$
$G = (GA+GB+GC+GD)/4$
$B = (BA+BB+BC+BD)/4$
$\alpha = (\alpha A + \alpha B + \alpha C + \alpha D)/4$

SHIFT TEXTURE COORDINATES IN LOWER-RIGHT DIRECTION $(RB, GB, BB, \alpha B)$
$(RD, GD, BD, \alpha D)$
$(RC, GC, BC, \alpha C)$

FIG. 26
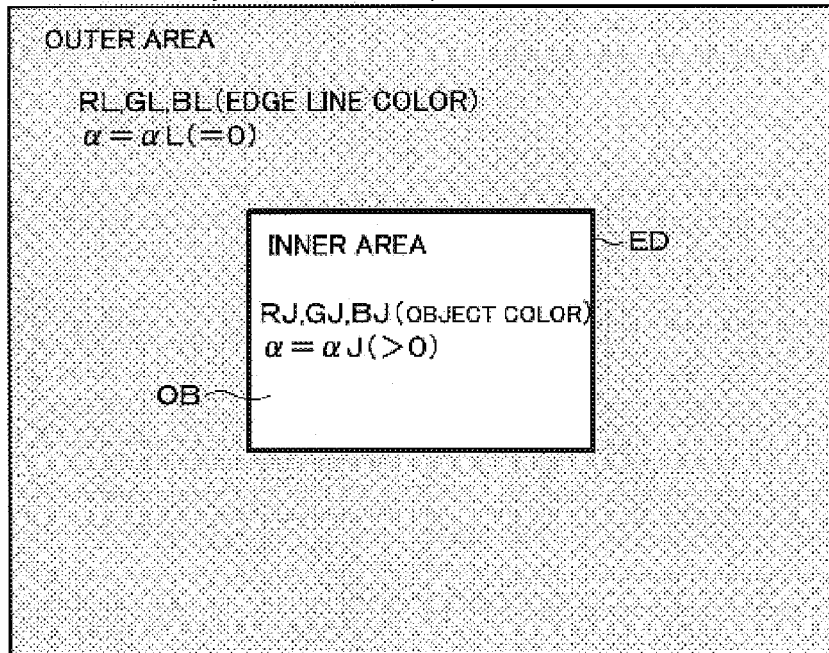
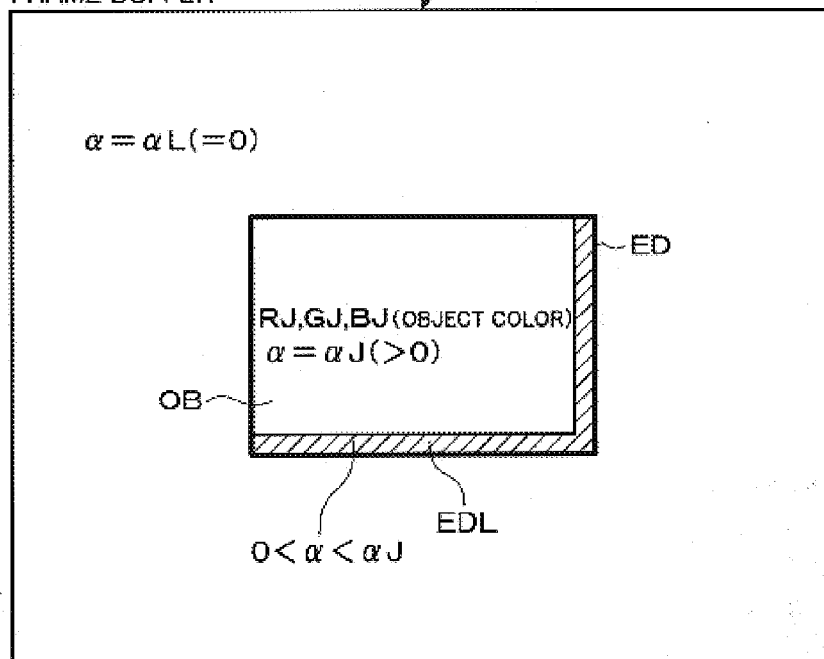

GAME SYSTEM, PROGRAM AND IMAGE GENERATING METHOD

TECHNICAL FIELD

The present invention relates to a game system, program and image generating method.

BACKGROUND OF ART

There is known a game system which can generate an image as viewed from a given viewpoint within an object space that is a virtual three-dimensional space. Such a game system is highly popular from the fact that it can provide a so-called virtual reality. If the game system is for a roll-playing game (RPG), a player can enjoy the game by controlling a character (or object) allocated to the player to move it on a map within the object space such that the player will fight against an enemy character, dialogue with any other character or visit various cities and towns.

In such a game system, an object representing a character is configured by a plurality of polygons or free-form surfaces (which are primitive surfaces in a broad sense). The image as viewed from the given viewpoint within the object space will be generated by arranging the object (model) configured by these polygons within the object space and then performing the geometry-processing (or three-dimensional computation) with respect to the object. Thus, the image can be generated in a more realistic form as if it exists in the real world scene.

On the other hand, the field of animated cartoons and comics makes an appeal to players by using an image similar to a cellular picture specific to the animation, rather than a realistic image actually photographed.

The game picture generated by the conventional game system can make an appeal to a person that likes the reality, but would not make an appeal to a person that likes the animation.

To overcome such a problem, the inventors have developed a game system which can generate a cellular image in real-time. The generation of the cellular image requires a process of drawing the edge line of an object including a character or the like (or a process of emphasizing the edge line).

However, it has been found that such a process contains the following problems.

(1) It is now assumed, for example, that an edge line having its thickness equal to one pixel is to be drawn around the outer periphery of an object. In such a case, a problem is not substantially raised if the distance between the viewpoint and the object is nearer (or if the object is larger relative to pixels on the screen). However, if the distance between the viewpoint and the object is farther (or if the object is smaller relative to pixels on the screen), an unnatural image will be generated since the thickness of the edge line will unnecessarily be increased relative to the size of the object.

(2) If the edge line and other objects are drawn in an inappropriate order or if an inappropriate Z-value (or depth value) is given to the edge line, an inappropriate hidden-surface removal or translucent-synthesizing will be made between the edge line and the other objects, thus creating an unnatural image.

DISCLOSURE OF INVENTION

The present invention provides a game system which generates an image, comprising: means which draws an image of an edge line of an object in an inside area of an edge of the object, the image of the edge line being generated based on an image of the object; and means which generates an image as viewed from a given viewpoint within an object space.

BRIEF DESCRIPTION OF THE DRAWINGS

FIG. 3 illustrates a technique of drawing the edge line within the inside area of the object edge.

FIG. 5 illustrates a problem raised from the fact that if the distance between an object and the viewpoint increases (or if the size of a perspectively transformed object decreases), the edge line of the object will unnecessarily be conspicuous.

FIG. 7A shows the characteristic of a function between the distance between the object and the viewpoint and the translucency of the edge line while

FIG. 13A shows a mapping image while FIG. 13B shows an image obtained by mapping the mapping image on a virtual polygon.

FIGS. 16A and 16B illustrate a technique of generating a virtual polygon.

FIGS. 17A and 17B illustrate a technique of generating a virtual polygon based on the coordinates of vertexes in a perspectively transformed object.

FIG. 22 illustrates a technique of drawing a mapping image on the frame buffer by mapping it on a virtual polygon through the bi-linear filtering method while shifting the texture coordinates by +0.5 pixels.

FIG. 26 illustrates a technique of drawing a mapping image on the frame buffer by mapping it on a virtual polygon through the bi-linear filtering method while shifting the texture coordinates by −0.5 pixels.

BEST MODE FOR CARRYING OUT THE INVENTION

Figure 1:
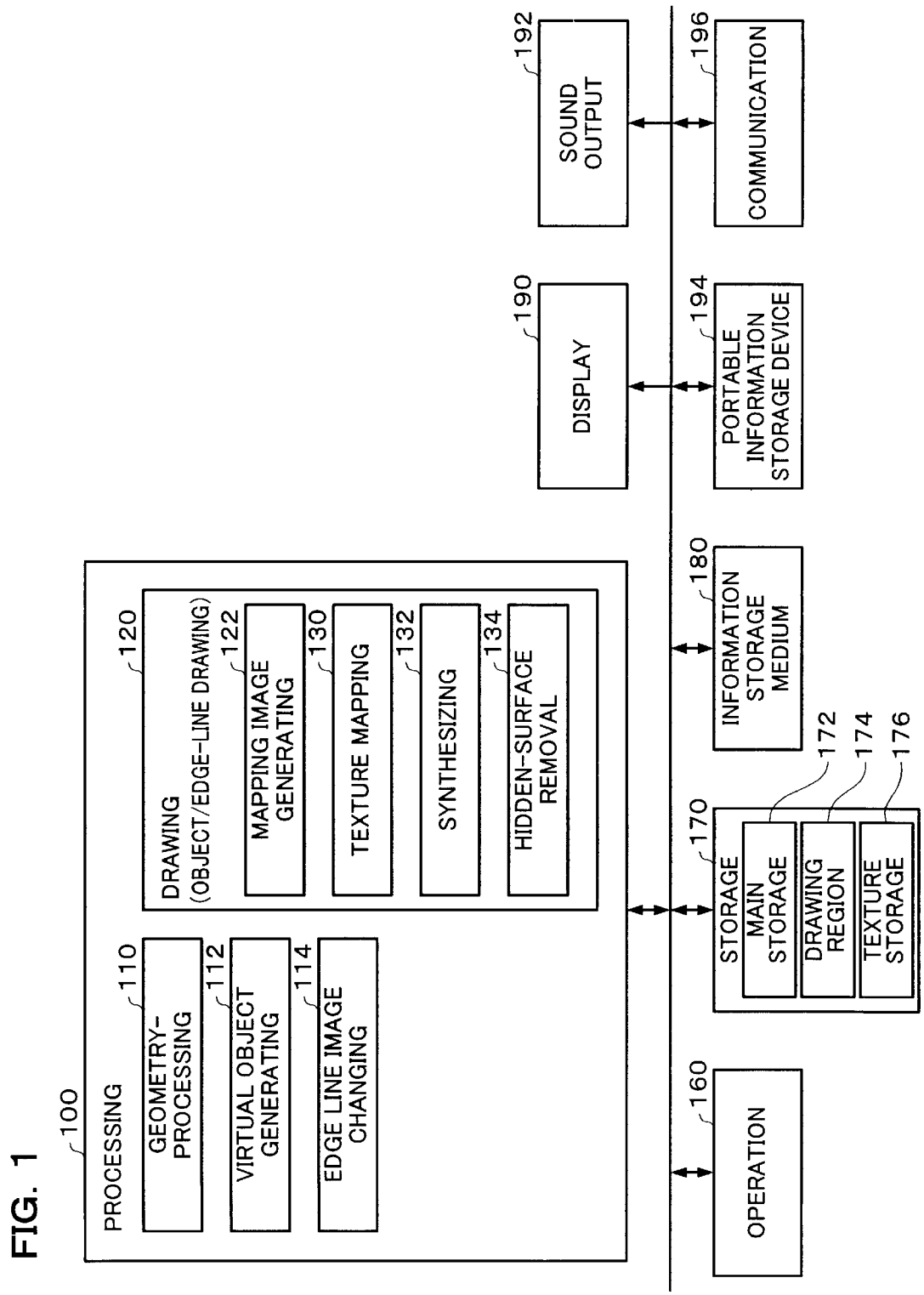
FIG. 1 is a functional block diagram of a game system according to this embodiment of the present invention.

In view of the aforementioned problems, an embodiment of the present invention provides a game system, program and image generating method which can effectively generate the image of an edge line in a more natural manner.

Embodiments of the present invention will now be described.

The embodiments described below are not intended to limit the contents of the present invention as defined in the appending claims. Moreover, all the components described in connection with the embodiments are not necessarily essential for carrying out the present invention.

An embodiment of the present invention provides a game system which generates an image, comprising: means which draws an image of an edge line of an object in an inside area of an edge of the object, the image of the edge line being generated based on an image of the object; and means which generates an image as viewed from a given viewpoint within an object space. This embodiment further provides a computer-usable program embodied on an information storage medium or in a carrier wave, comprising a processing routine for causing a computer to execute the above-described means.

According to this embodiment, the image of an edge line of an object is generated based on the image of the object (e.g., an image drawn in a drawing region, a perspectively transformed two-dimensional image or the like). The image of this edge line is then drawn in the inside area of the object edge. Thus, the object image can be synthesized with the edge line image, for example, through translucent-synthesizing (alpha (α) blending or the like). Furthermore, the Z-value of the object can easily be set as that of the edge line to realize an appropriate hidden-surface removal or the like. As a result, the image of the edge line can effectively be generated in a more natural manner.

The object, the edge line of which is to be drawn may be the entire model object or a partial object (or sub-object) that is one of partial objects configuring a model object. It is particularly desirable that the technique of drawing the edge line of the object is such a technique which shifts the texture coordinates through the texel interpolation, but the embodiment is not limited to such a technique.

In the game system, program and image generating method according to this embodiment, the image of the object may be translucent-synthesized with the image of the edge line of the object based on a translucency determined depending on a distance from the viewpoint or a size of the object that has been perspectively transformed. Thus, the edge line of the object can be more transparent as the distance between the object and the viewpoint increases or as the size of the perspectively transformed object decreases. As a result, there can be overcome such a problem that the relative thickness of the edge line of the object becomes conspicuous.

The distance from the viewpoint may be any of various parameters such as the depth distance, the linear distance between the viewpoint and the object and other equivalent distances. Furthermore, the size of the object may be any of various parameters such as the total number of pixels in the object (or the number of longitudinal pixels×the number of transverse pixels), the number of longitudinal pixels, the number of transverse pixels and so on.

Alternatively, there may be generated a virtual object which encloses the image of the perspectively transformed object and the size of which is variable depending on the size of the perspectively transformed object. The size of such a virtual object may be set as the size of the object.

In the game system, program and image generating method according to this embodiment, a Z-value of the object in a position where the edge line thereof is to be drawn may be set as the Z-value of the edge line. Thus, a Z-value can be set appropriate to the edge line to realize an appropriate hidden-surface removal between the object and another object.

In the game system, program and image generating method according to this embodiment, the image of the edge line of the object may be generated by generating a mapping image including color information of the object set in the inside area of the edge of the object and the color information of the edge line set in the outside area of the edge of the object, texture-mapping the generated mapping image onto a virtual object through a texel interpolation while shifting a texture coordinate in a first direction, and then mapping the mapping image onto the virtual object through the texel interpolation while shifting the texture coordinate in a second direction. Thus, the edge line of the object can be drawn through a simple process in which the generated mapping image is only mapped on the virtual object through the texel interpolation while shifting the texture coordinates in the first or second direction. Therefore, a game image which can appeal to a person who likes the comics or animations can be generated with reduced processing load.

The texel interpolation is, although not particularly limited to, a method of interpolating the image information of texels to provide the image information of pixels. Such a process may be bi-linear or tri-linear filtering method.

It is desirable that the virtual object is a primitive surface such as a polygon or the like. However, it may be a three-dimensional object. Although it is further desirable that the virtual object is not displayed on the screen, it may be displayed on the screen.

In the game system, program and image generating method according to this embodiment, the mapping image may be generated by drawing the object that has been perspectively transformed in a drawing region where a background to which the color information of the edge line is set is drawn. Thus, the mapping image can be generated through a simple process in which the perspectively transformed object is drawn in the drawing region after the color information has been set to the background.

In the game system, program and image generating method according to this embodiment, the virtual object may enclose whole or part of the object that has been perspectively transformed, and has a size variable depending on a size of the perspectively transformed object. When the area occupied by the object within the screen changes, thus, the size of the virtual object may correspondingly changes. Therefore, the drawing process can more effectively be carried out in an appropriate range depending on the size of the perspectively transformed object.

In the game system, program and image generating method according to this embodiment, the virtual object may be generated based on a coordinate of a definition point of the perspectively transformed object. Thus, it is possible to generate the virtual object having a size variable depending on the size of the perspectively transformed object, for example, merely by determining the maximum value, minimum value or the like in the coordinates of the definition point (or control point, vertex or the like) in the perspectively transformed object. The drawing load can be reduced since the size of the virtual object can appropriately be reduced depending on the size of the perspectively transformed object.

In the game system, program and image generating method according to this embodiment, when a simplified object is set relative to the object, the virtual object may be generated based on the coordinate of a definition point of the simplified object that has been perspectively transformed. Thus, it is possible to generate the virtual object having a size variable depending on the size of the perspectively transformed object, for example, merely by determining the maximum value, minimum value or the like in the coordinates of the definition point (or control point, vertex or the like) in the perspectively transformed simplified-object. This provides an advantage in that the processing load can be reduced since the process of determining the maximum value, minimum value or the like is carried out relative to the coordinates of the vertexes in the simplified object which has the reduced number of vertexes.

In the game system, program and image generating method according to this embodiment, an alpha value set in the inside area of the edge of the object may be different from an alpha value set in the outside area of the edge of the object, and an edge line region in the inside area of the edge of the object may be detected based on an alpha value that has been subjected to the texel interpolation. Thus, at the same time when the mapping image is mapped on the virtual object through the texel interpolation, the alpha value used to detect the edge line region in the inside area of the edge of the object will be generated. This improves the efficiency in the process.

In the game system, program and image generating method according to this embodiment, after the object has been drawn in a drawing region, the image of the edge line may be drawn in the inside area of the edge of the object that has been drawn in the drawing region. By controlling the drawing order in this manner, synthesizing processing (translucent-synthesizing or the like) between the object image and the image of the edge line can be appropriately carried out.

The preferred embodiment of the present invention will be described in more detail with reference to the drawings.

1. Configuration

FIG. 1 shows a functional block diagram of a game system (image generating system) according to this embodiment. In this figure, this embodiment may comprise at least a processing section 100 (or a processing section 100 with a storage section 170). Each of the other blocks may take any suitable form.

A control section 160 is used to input operational data from the player and the function thereof may be realized through any suitable hardware means such as a lever, a button, a housing or the like.

The storage section 170 provides a working area for the processing section 100, a communication section 196 and others. The function thereof may be realized by any suitable hardware means such as RAM or the like.

An information storage medium (which may be a computer-usable storage medium) 180 is designed to store information including programs, data and others. The function thereof may be realized through any suitable hardware means such as an optical memory disk (CD or DVD), magneto-optical disk (MO), magnetic disk, hard disk, magnetic tape, memory (ROM) or the like. The processing section 100 performs various processings in the present invention (or this embodiment) based on the information that has been stored in this information storage medium 180. In other words, the information storage medium 180 stores various pieces of information (or programs and data) for executing the means of the present invention (or this embodiment) which are particularly represented by the blocks included in the processing section 100.

Part or the whole of the information stored in the information storage medium 180 will be transferred to the storage section 170 when the system is initially powered on. The information stored in the information storage medium 180 may contain at least one of a program for performing the processings in the present invention, image data, sound data, shape data of objects to be displayed, information for instructing the processings in the present invention, information for performing the processings according to these instructions or the like.

A display section 190 is to output an image generated according to this embodiment and the function thereof can be realized by any suitable hardware means such as CRT, LCD or HMD (Head-Mount Display).

A sound output section 192 is to output a sound generated according to this embodiment and the function thereof can be realized by any suitable hardware means such as a speaker.

A portable information storage device 194 is to store the player's personal data and save data and may be take any suitable form such as a memory card, a portable game machine or the like.

A communication section 196 is designed to perform various controls for communication between the present game system and any external device (e.g., a host device or other image generating system). The function thereof may be realized through any suitable hardware means such as various types of processors or communication ASIS or according to any suitable program.

The program or data for executing the means in the present invention (or this embodiment) may be delivered from an information storage medium included in a host device (or server) to the information storage medium 180 through a network and the communication section 196. The use of such an information storage medium in the host device (or server) falls within the scope of the invention.

The processing section (processor) 100 is to perform various processings such as game processing, image generating or sound generating, based on the control data or program from the control section 160. The function of the processing section 100 may be realized by any suitable processor (CPU, DSP or the like), any suitable hardware means such as ASIC (gate array or the like) or a given program (game program).

The processing section 100 may be designed to perform various processes such as coin (or charge) reception, setting of various modes, game proceeding, setting of scene selection, determination of the position and rotation angle (about X-, Y- or Z-axis) of an object, movement of the object (motion processing), determination of the position of the viewpoint (or virtual camera) and the angle of visual line (or the rotational angle of the virtual camera), arrangement of the object within the object space, hit checking, computation of the game results (or scores), processing for causing a plurality of players to play in a common game space and various other game processings including game-over.

The processing section 100 generates an image as viewed from a given viewpoint (or virtual camera) within the object space, based on the aforementioned game processing results and then outputs it toward the display section 190.

The processing section 100 further performs various sound processings to generate BGMS, sound effects or voices, based on the aforementioned game processing results and then outputs these sounds toward the sound output section 190.

All the functions of the processing section 100 may be realized by any suitable hardware means or according to the program. Alternatively, these functions may be realized by both the hardware means and program.

The processing section 100 comprises a geometry-processing section 110, a virtual object generating section 112, an edge-line image changing section 114 and a drawing section 120.

The geometry-processing section 110 is to perform various geometry-processings (or three-dimensional computation) such as coordinate transformation, clipping, perspective transformation or light-source computation with reference to the object. The resulting drawing data (such as vertex coordinates, texture coordinates, color (brightness) data, normal vector or alpha value) is stored and saved in a main storage section 172 of the storage section 170.

The virtual object generating section 112 is to generate a virtual object onto which a mapping image is to be mapped. This mapping image is generated by a mapping image generating section 122 included in the drawing section 120 as will be described later.

In this embodiment, this virtual object (which is, in a narrow sense, a virtual polygon) is one that encloses the whole or part of the image of an object after the perspective transformation or transformation into the screen coordinate system and that changes its size depending on the size of the perspectively transformed object. In other words, the size of the virtual object changes depending on the screen area occupied by the object. The mapping image generated by the mapping image generating section 122 will be mapped onto such a virtual object that has its size variable depending on the area of the screen occupied by the object. Therefore, the texture mapping and virtual object drawing processes can more effectively be performed.

The edge-line image changing section 114 is to change the image of an edge line to be applied to the object depending on the distance between the object and the viewpoint or the size of the perspectively transformed object (size relative to the pixel). More particularly, the edge-line image changing section 114 is to perform a process of translucent-synthesizing the object image with the object edge line image with a translucency determined on the distance between the object and the viewpoint or the size of the perspectively transformed object, including a process of determining the translucency, a process of determining the order of drawing or the like. Alternatively, a process of approaching the color of the edge line to a given second color depending on the distance between the object and the viewpoint or the size of the perspectively transformed object, including a process of setting a second color or the like.

The drawing section (or object/edge-line drawing section) 120 is to draw a geometry-processed object (model) or the edge line of the object in a drawing region 174 which can store the image information by pixel, such as frame buffer or work buffer.

More particularly, the drawing section 120 performs the drawing process such that the image of the edge line generated based on the image of the object (e.g., the image of the perspectively transformed object or the image of the object on the drawing region) will be drawn in the inside area of the object edge. Thus, the process of translucent-synthesizing the object image with the edge line image or the process of setting the Z-value of the object in the edge-line drawing position as that of the edge line can be realized in a simple and easy manner.

The drawing section 120 comprises a mapping image generating section 122, a texture mapping section 130, a synthesizing section 132 and a hidden-surface removal section 134.

The mapping image generating section 122 is to generate a mapping image which includes object color information set relative to the inside area of the object edge and edge color information set relative to the outside area of the object edge.

The texture mapping section 130 is to map a texture stored in a texture storage section 176 onto the object.

More particularly, the texture mapping section 130 performs a process of mapping the mapping image generated by the mapping image generating section 122 onto a virtual object generated by the virtual object generating section 112. In this case, the texture mapping section 130 maps the generated mapping image onto the virtual object through the texel interpolation (which is, in a narrow sense, a bi-linear filter) while shifting the texture coordinates, for example, by a value smaller than one texel (or pixel). For example, the texture coordinates may be shifted from such texture coordinates as obtained based on the position in which the mapping image is drawn. Thus, the edge line of the object can be drawn with reduced processing load.

The synthesizing section 132 is to perform a mask process or a translucence processing using an alpha value. The alpha value (A-value) is information stored in association with each of the pixels. For example, the alpha value may be additional information other than color information. The alpha value can be used as mask information, translucency (which is equivalent to transparency or opacity), bump information and so on.

The hidden-surface removal section 134 is to use Z-buffer (or Z-plane) storing Z-value (or depth value) for performing the hidden-surface removal according to the algorism of Z-buffer process. For example, the Z-value of the object in the edge-line drawing position will be written into this Z-buffer and the hidden-surface removal relating to the edge line will be performed based on this written Z-value. The hidden-surface removal may be performed through the depth sorting process (or Z sorting process) in which the primitive surfaces are sorted depending on the distance between the object and the viewpoint, the primitive surfaces being drawn in the order starting from the farthest point relative to the viewpoint.

The game system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

Figure 2:
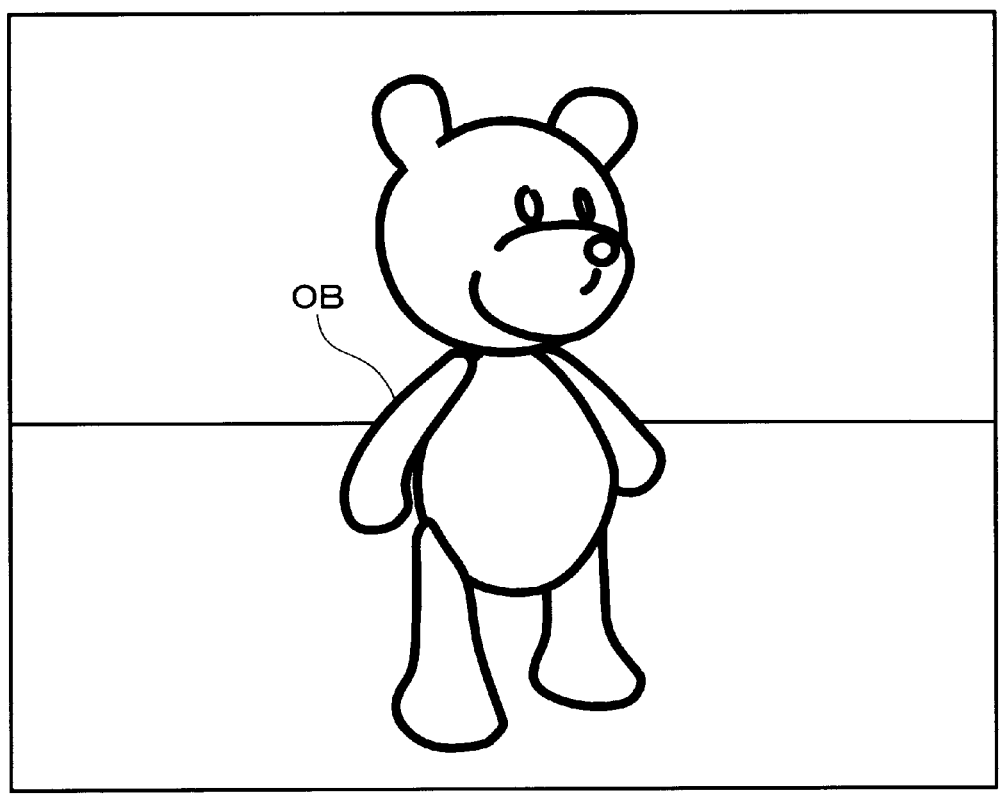
FIG. 2 is an image generated according to this embodiment.

2. Features of this Embodiment
2.1 Drawing of the Edge Line in the Inside Area of the Object FIG. 2 shows a game image generated by the game system according to this embodiment. As shown in FIG. 2, this embodiment successfully generates a cellular picture-like image familiar to many people through comics and animated cartoons by drawing a thick edge line along the edge of an object OB configured by polygons.

As shown in FIG. 3, this embodiment performs a drawing process in which the image of the edge line EDL of the object OB obtained as by applying a two-dimensional process to the image of the object OB is drawn in the inside area of the edge ED of the object OB.

This allows a process of translucent-synthesizing (translucent-blending) the image of the object OB with the image of the edge line EDL based on a translucency determined on the distance between the object and the viewpoint or the size of the perspectively transformed object OB or another process of setting the Z-value of the object OB in the edge-line drawing position as the Z-value of the edge line EDL.

The technique of drawing the edge line as shown in FIG. 2 may include that of the following comparative example.

Figure 4C:
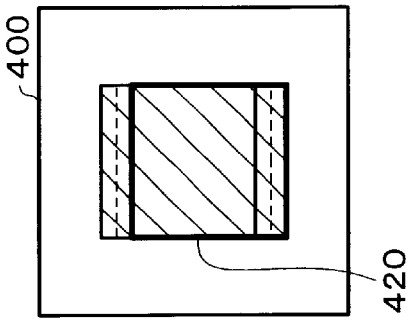
FIGS. 4A to 4F illustrate comparative examples.
Figure 4F:
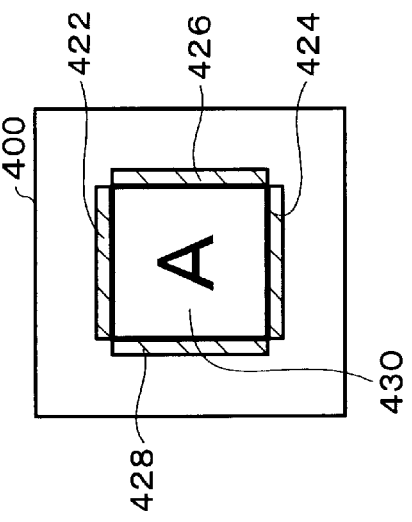
Figure 4B:
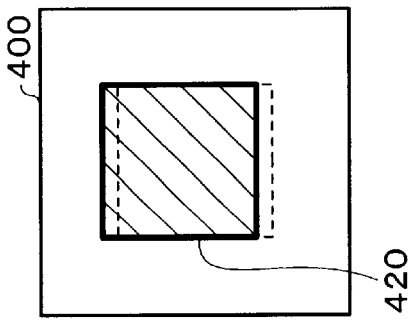
Figure 4E:
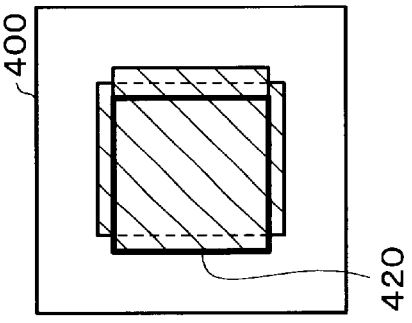
Figure 4A:
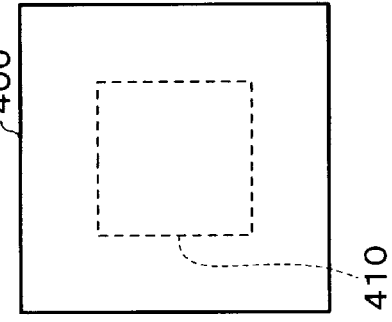
Figure 4D:
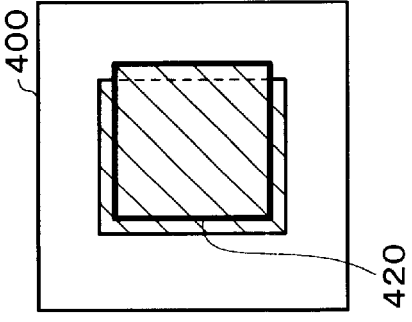

As shown in FIGS. 4A and 4B, this comparative example draws an edge line image 420 (or an image filled with the color of the edge line) in a destination area 410 in which an original image is to be drawn on a drawing region 400 (frame buffer or the like), for example, while shifting the edge line image 420 by a few pixels in the upward direction. Similarly, the edge line image 420 is drawn in the same area 410 while shifting it by a few pixels respectively in the downward, rightward and leftward directions, as shown in FIGS. 4C, 4D and 4E. Finally, an original image 430 is drawn in the destination area 410, as shown in FIG. 4F.

This comparative example only requires the two-dimensional processing to draw the edge line. Although the processing load in the drawing processor becomes heavier, the processing load in CPU for performing the three-dimensional processing can be reduced.

In the comparative example, however, the edge lines (422, 424, 426 and 428) will be drawn in the outside area of the edge of the object (430), as will be apparent from FIG. 4F.

Consequently, the comparative example cannot perform the process of translucent-synthesizing the image of the object with the image of the edge line. Thus, it is difficult to overcome such a problem that the relative size of the edge line is unnecessarily conspicuous when the object is farther away from the viewpoint.

In the comparative example, it is also difficult to set the Z-value of the object in the edge-line drawing position as the Z-value of the edge line since the edge lines are drawn in the outside area. As a result, the hidden-surface removal and translucent-synthesizing will inappropriately be performed between the edge lines and the other objects (background and so on). This raises a problem in that an unnatural image will be generated.

On the contrary, this embodiment can easily overcome the aforementioned problem in the comparative example by drawing the image of the edge line EDL in the inside area of the object OB as shown in FIG. 3.

2.2 Process of Changing the Translucency in the Edge Line

In a three-dimensional game, the viewpoint of a player (or virtual camera) is moved to an arbitrary position depending on the operational input from the player. Thus, an object representing a character is correspondingly moved to an arbitrary position. This means that the distance between the player's viewpoint and the object is also variable to change the size of the perspectively transformed object (or the relative size of the object relative to the pixel on the screen).

If an edge line having its constant thickness (e.g., one pixel) is to be drawn relative to an object having its variable size, the following problem will be raised.

If the distance between the viewpoint and the object OB is nearer (e.g., the screen area occupied by the object being larger) as shown by A1 in FIG. 5, the edge line EDL of the object is not conspicuous in thickness, thereby providing a natural image.

However, if the distance between the viewpoint and the object OB is farther (e.g., the screen area occupied by the object being smaller) as shown by A2 and A3 in FIG. 5, the edge line EDL of the object is unnecessarily conspicuous in thickness, thereby providing an unnatural image.

Particularly, if the total number of pixels in the object OB (the number of longitudinal pixels×the number of transverse pixels) becomes equal to 1 to 10 pixels as shown by A3, the object OB will be looked as if it is filled with the color of the edge line EDL. For example, if the color of the object OB is red while the color of the edge line EDL is black, the image of the object OB, which should inherently be looked to be red, will be looked as if it is a black-colored spot.

To overcome this problem, this embodiment is to translucent-synthesizing (or alpha blending) the image of the object with the image of the object edge line based on a translucency determined on the distance between the object and the viewpoint or the size of the perspectively transformed object.

Figure 6:
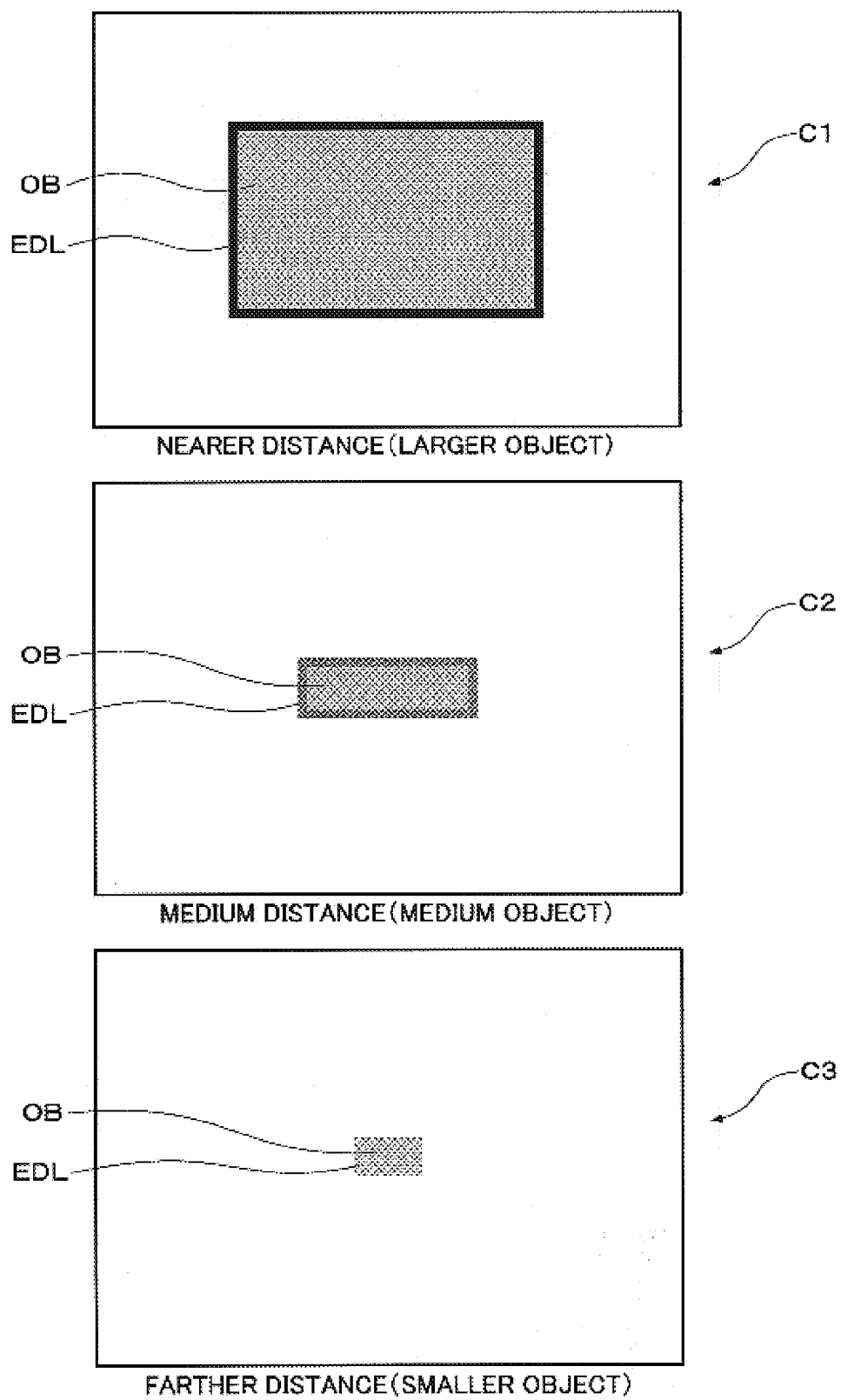
FIG. 6 illustrates a technique of changing the translucency of the edge line depending on the distance between the object and the viewpoint or the size of the perspectively transformed object.

In other words, as shown by C1 and C2 in FIG. 6, the edge line EDL is made more transparent by changing the translucency of the edge line EDL of the object OB as the distance between the object and the viewpoint increases (or as the size of the perspectively transformed object decreases). If the distance between the object and the viewpoint sufficiently increases (or the size of the perspectively transformed object sufficiently decreases), the image of the edge line EDL substantially disappears, as shown by C3.

As will be apparent from the comparison between A2 of FIG. 5 and C2 of FIG. 6, this can overcome such a problem that the thickness of the edge line EDL is unnecessarily conspicuous. As will be apparent from the comparison between A3 of FIG. 5 and C3 of FIG. 6, such a problem that the object OB will be looked as if it is filled with the color of the edge line EDL can also be overcome. If it is assumed, for example, that the color of the object OB is red while the color of the edge line EDL is black, the color of the object OB is represented by its inherent red color without being filled with the black color, thereby providing a more natural image, even though the distance between the object and the viewpoint sufficiently increases.

The technique of FIG. 6 is particularly effective in the case where the edge line EDL is drawn in the inside area of the edge ED of the object OB as shown in FIG. 3.

If an edge line is drawn in the outside area of the edge as shown in FIG. 4F, the translucent-synthesizing will be carried out between this edge line and any other object (than an object having its edge line to be drawn). This requires the complicated Z-sorting process between the edge line and the other object. Furthermore, the translucent-synthesizing process between the edge line and the other object may generate an unnatural image.

On the contrary, the technique of FIG. 6 in which the edge line is drawn in the inside area of the edge only requires to keep such an order of drawing that first draws the object and then the edge line. This permits the translucent-synthesizing between the object and the edge line. Therefore, the control of the drawing order can be simplified without translucent-synthesizing the edge line with any other object, thus providing a more natural image.

The technique of controlling the translucency of the edge line depending on the distance between the object and the viewpoint or the size of the object may be any of various techniques.

Figure 7A:
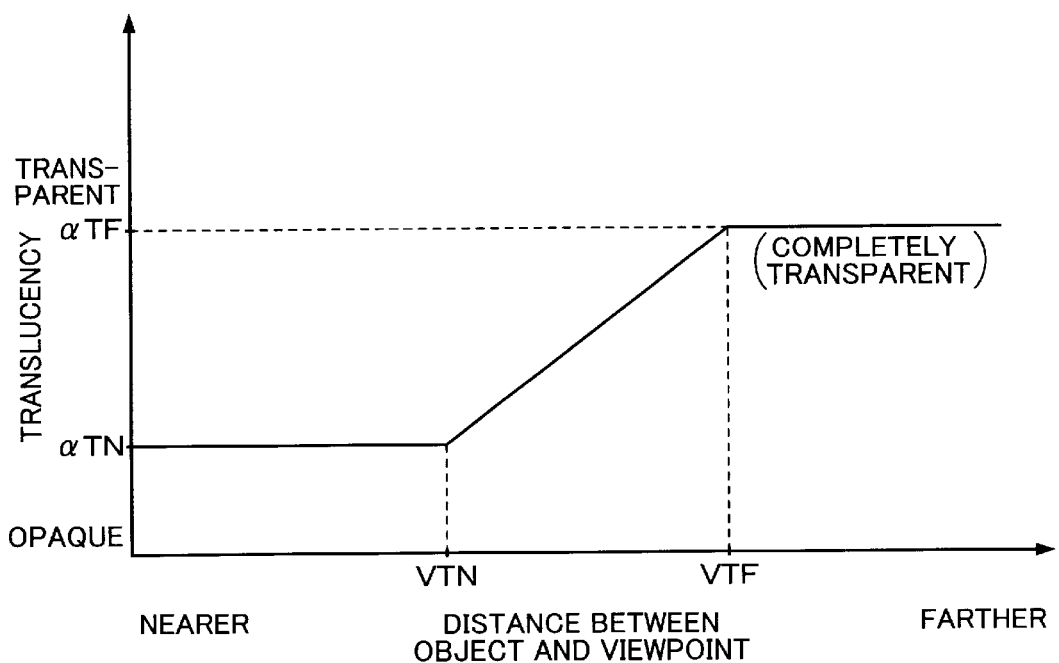

If it is assumed, for example, that the distance between the object and the viewpoint becomes farther than a threshold value VTN as shown in FIG. 7A, the translucency αT begins to change from the nearer-range αTN, thus beginning to make the edge line of the object transparent. Thus, the edge line will gradually be inconspicuous.

When the distance between the object and the viewpoint is larger than another threshold value VTF, the translucency αT is set at the farther-range αTF. Thus, the edge line of the object may completely be transparent (or invisible) as shown by C3 in FIG. 6. This prevents the object from being filled with the color of the edge line.

Figure 7B:
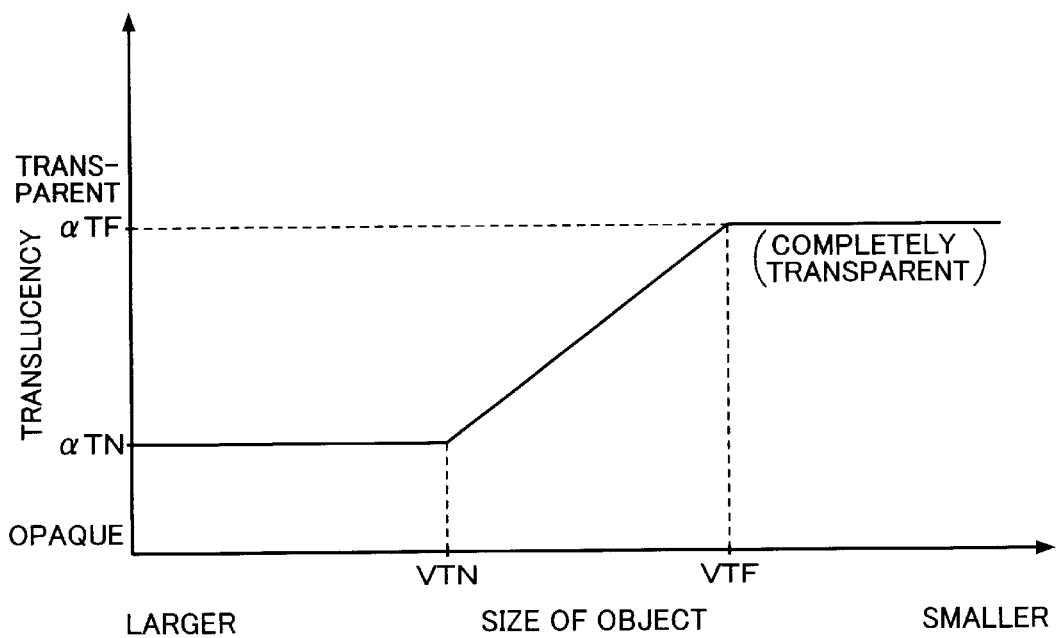
FIG. 7B shows the characteristic of a function between the size of the perspectively transformed object and the translucency of the edge line.

In FIG. 7B, the transparency αT begins to change from αTN with the edge line of the object beginning to be made transparent, when the size of the object becomes smaller than the threshold VTN.

When the size of the object becomes smaller than the threshold VTF, the transparency αT is set to αTF. Thus, the edge line of the object may completely be transparent (invisible) as shown by C3 in FIG. 6.

In view of the reduction of processing load, it is particularly desirable that the distance from the viewpoint in FIG. 7A is the depth distance (Z-value) of the object (at the representative point thereof). However, the present invention is not limited to the depth distance, but may be the linear distance between the viewpoint and the object, for example. Alternatively, the distance from the viewpoint may be any other equivalent parameter which can provide the similar effect as in the case where the depth distance or the linear distance is changed.

In view of the reduction of processing load, it is desirable that the size of the object in FIG. 7B is represented by the total number of pixels (the number of longitudinal pixels× the number of transverse pixels) in the object. However, the present invention is not limited to the total number of pixels, but may use either of the number of longitudinal or transverse pixels in the object. Alternatively, the present invention may use any other equivalent parameter which can provide the similar effect as in the case where the number of pixels is changed.

Figure 8A:
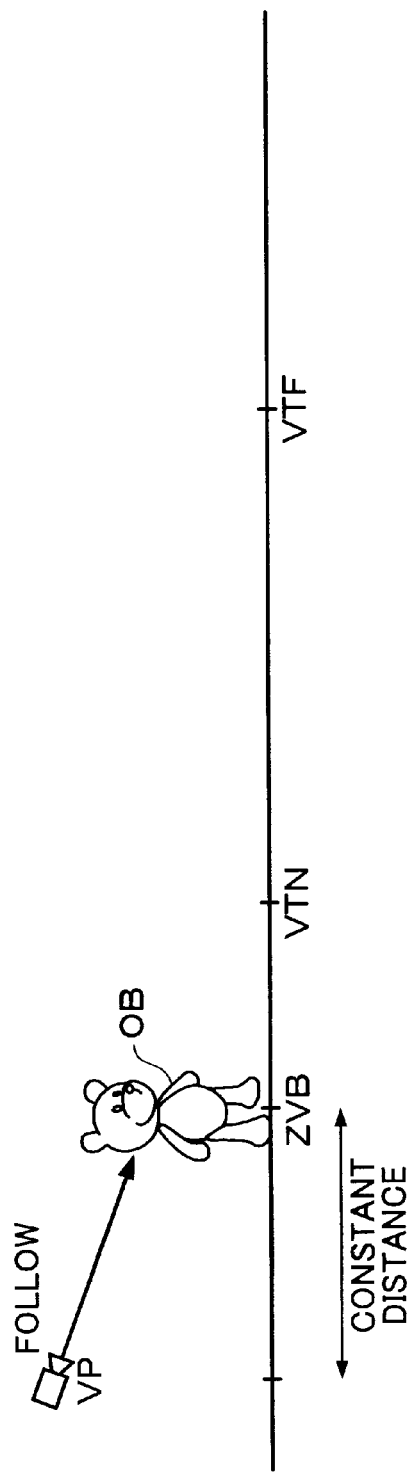
FIGS. 8A and 8B illustrate a technique of setting a threshold value VTN.
Figure 8B:
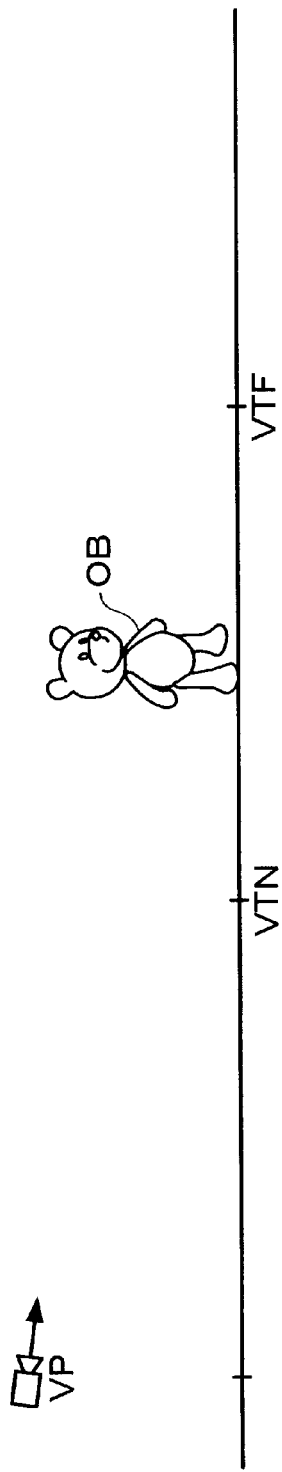

When the object OB moves in the three-dimensional game of such a type, the viewpoint VP (or virtual camera) frequently follows the object OB while maintaining a substantially constant distant ZVB between the object OB and the viewpoint VP, as shown in FIG. 8A.

In such a situation, if the translucency of the edge line is frequently changed depending on the distance between the object and the viewpoint or the size of the object as shown in FIG. 6, an image looked to be unnatural for a player will be generated.

To overcome such a problem, this embodiment maintains the transparency of the edge line of the object OB substantially constant if the distance between the object OB and the viewpoint VP is substantially equal to a distance ZVB held when the viewpoint VP follows the object OB (which will be referred to "the follow and moving mode"). Alternatively, the translucency of the edge line of the object OB may be maintained substantially constant if the size of the perspectively transformed object OB is substantially equal to that of the object in the following and moving mode (or the size of the object in the distance ZVB). More particularly, the threshold value VTN has been set at a distance larger than the distance ZVB (or a value smaller than the size of the object OB in the following and moving mode). As will be apparent from the functional characteristics of FIGS. 7A and 7B, thus, the translucency of the edge line will not change in the following and moving mode. This can overcome the aforementioned problem that an unnatural image will be generated in the following and moving mode.

If there occurs any event releasing the following and moving mode and when the distance between VP and OB becomes larger than the threshold value VTN (or the size of the object decreases), the translucency of the edge line will change depending on the distance between the object OB and the viewpoint VP or the size of the object OB as shown in FIG. 6. This can also overcome such a problem that the occurrence of the aforementioned event increases the distance between the viewpoint and the object to make the relative thickness of the edge line unnecessarily conspicuous.

When the upper threshold value VTF (or a given threshold value) is set as shown in FIGS. 7A and 7B, the following effects can be provided.

If the edge line EDL is not completely transparentized when the size of the object OB decreases as shown by A3 of FIG. 5 there will be generated an unnatural image in which the object OB is looked as if it is filled with the color of the edge line EDL.

Thus, the threshold value VTF has been set such value that when the size of the object OB is as shown by A3 of FIG. 5, the color of the edge line EDL is completely transparentized. Thus, when the size of the object OB is as shown by A3 of FIG. 5, the edge line EDL becomes invisible as shown by C3 of FIG. 6. This can prevent such a problem that an unnatural image as shown by A3 of FIG. 5 will be generated.

By changing the translucency of the edge line between the threshold values VTN and VTF, there can be overcome such a problem that the player can know when the translucency of the edge line changes.

2.3 Setting the Z-value of the Edge Line

This embodiment sets the Z-value of the object in a position in which the edge line thereof is drawn as the Z-value of the edge line.

Figure 9:
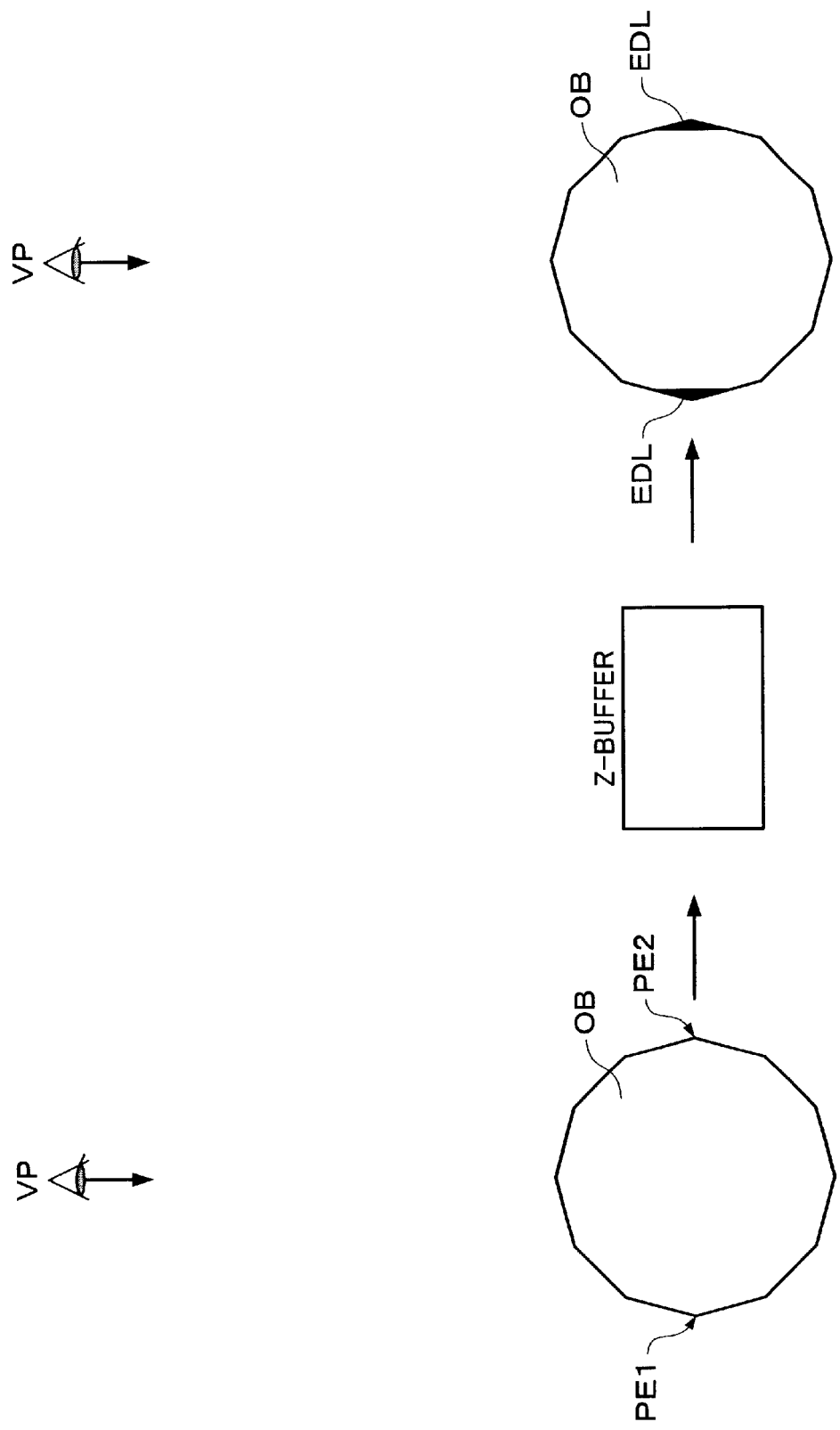
FIG. 9 illustrates a technique of setting the Z-value of the object in an edge-line drawing position as the Z-value of the edge line.

More particularly, as shown in FIG. 9, each of the Z-values in the object in two edge-line drawing positions PE1 and PE2 is set as the Z-value of the edge line EDL. Speaking in further detail, the Z-values of the object OB in the edge-line drawing positions PE1 and PE2 are written into Z-buffer when the object OB is drawn in a drawing region (work buffer or frame buffer), each of the written Z-values being then used as the Z-value of the edge line EDL.

This permits an appropriate hidden-surface removal to be performed between the edge line EDL and any other object. The setting of each of the Z-values at the edge-line drawing positions PE1 and PE2 as the Z-value of the edge line EDL is enabled because the edge line EDL is drawn in the inside area of the edge ED in the object OB as shown in FIG. 3.

Figure 10A:
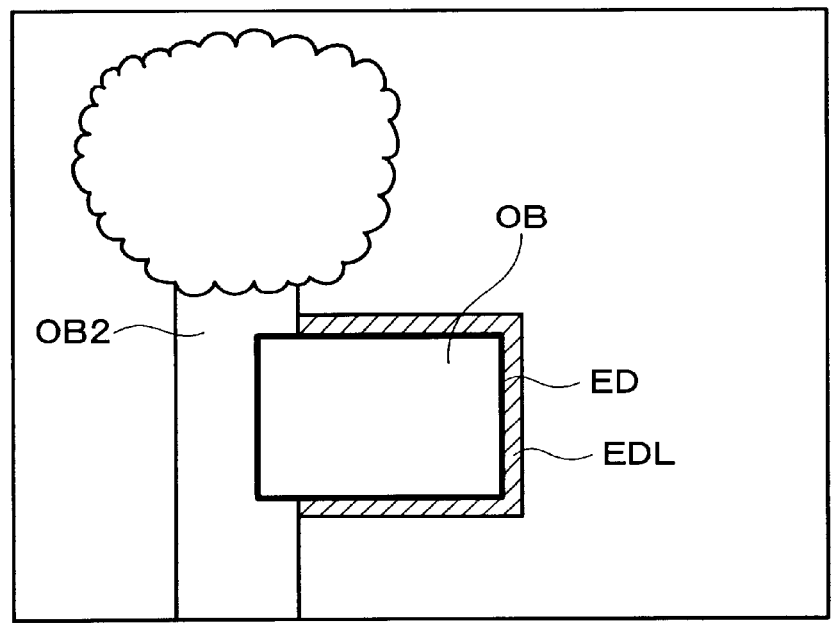
FIGS. 10A and 10B illustrate a problem raised when the edge line is drawn in the outside region of the object edge.

For example, if the edge line is drawn in the outside area of the object edge as shown in FIG. 4F, it is difficult to give an appropriate Z-value to the edge line. If an appropriate Z-value is not given to the edge line, the hidden-surface removal will not accurately be performed as shown in FIG. 10A, thus resulting in such a disadvantage that the edge line EDL will invisibly be hidden behind any other object OB2 such as background or the like, for example.

Figure 10B:
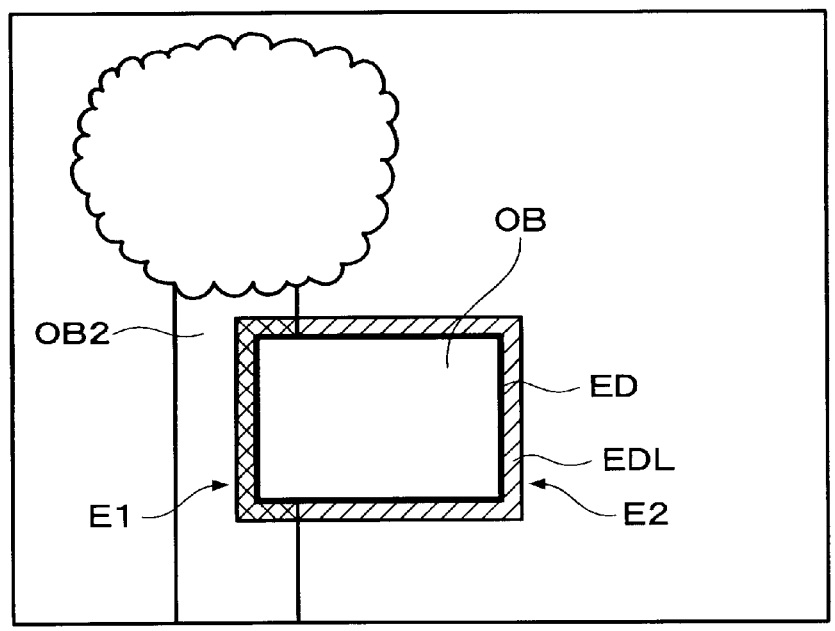

If the edge line is drawn in the outside area of the object edge, furthermore, the translucent-synthesizing will be performed between the edge line EDL and the other object OB2 as shown in FIG. 10B when the translucent-synthesizing process for the edge line EDL is made as shown in FIG. 6. As a result, a portion shown by E1 in FIG. 10B becomes different from another portion shown by E2 in FIG. 10B relating to the color of the edge line EDL, thus providing an unnatural image.

Figure 11:
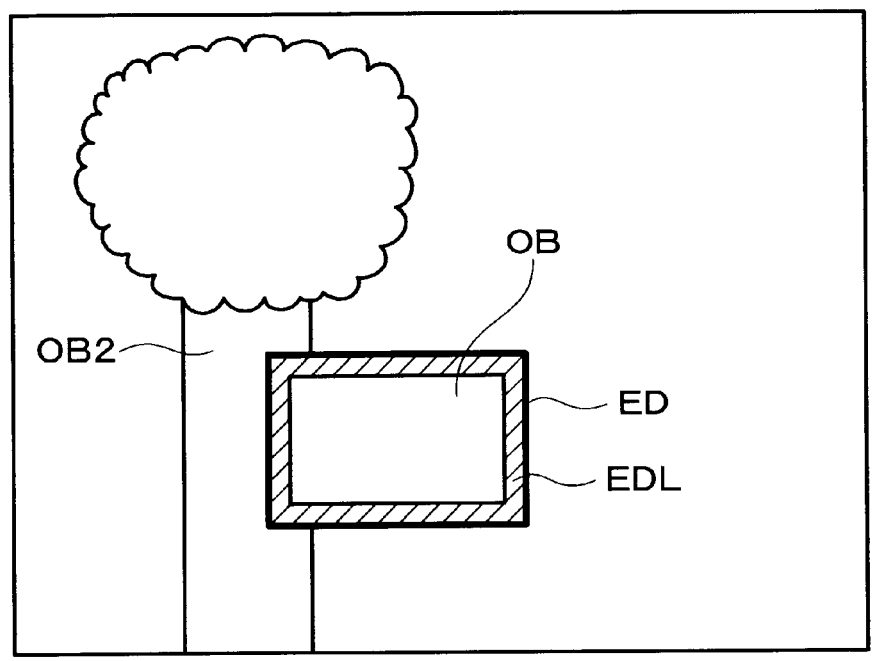
FIG. 11 shows an image generated when the edge line is drawn in the inside region of an object and when the Z-value of the object in the edge-line drawing position is set as the Z-value of the edge line.
Figure 12:
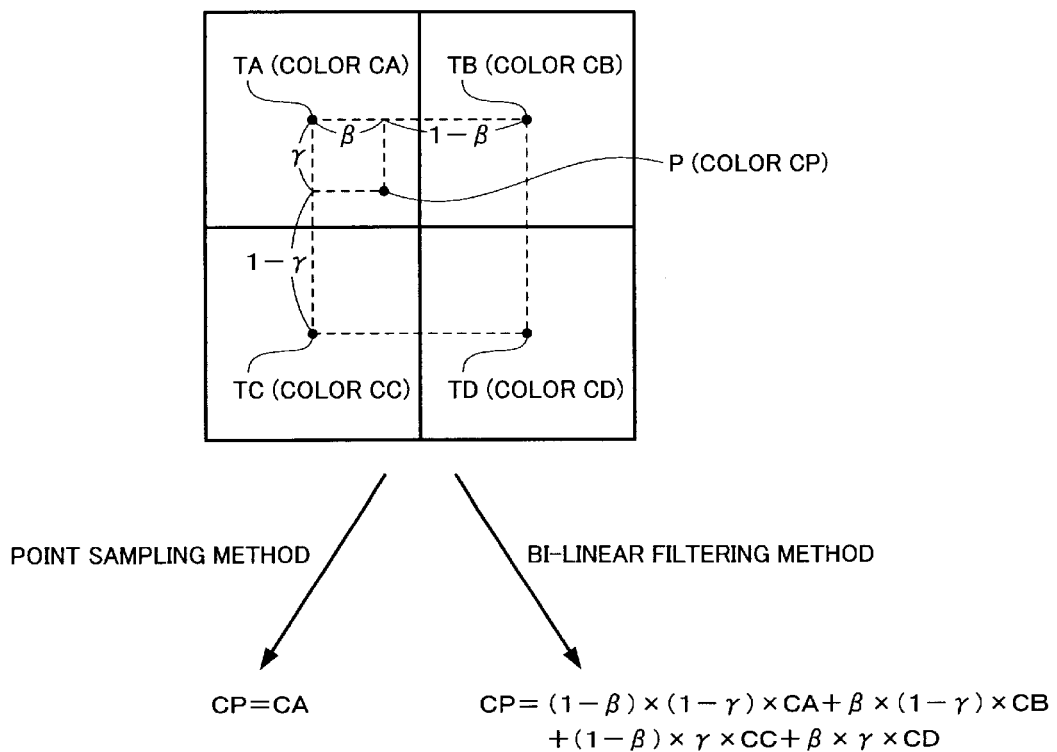
FIG. 12 illustrates the bi-linear filtering type texture mapping.

If the edge line is drawn in the inside area of the object edge and the Z-value of the object in the edge-line drawing position is set as the Z-value of the edge line as in this embodiment, the hidden-surface removal will accurately be made as shown in FIG. 11. This prevents the edge line EDL from being invisibly hidden behind the other object OB2. Merely by keeping the order of drawing in which the edge line EDL is drawn after the object OB has been drawn, it is ensured that the translucent-synthesizing is performed between the object OB and the edge line EDL. This can avoid such a problem of FIG. 10B that the translucent-synthesizing process will be performed between the edge line EDL and the other object OB2.

2.4 Drawing of the Edge Line Using the Bi-linear Filtering Type Texture Mapping This embodiment draws the edge line effectively using the bi-linear filtering (in a broad sense, texel interpolation) type texture mapping.

The texture mapping may create a difference between the positions of pixel and texel.

In such a case, the color CP (which is, in a broad sense, image information) of a pixel (or sampling point) P in the point sampling mode is equal to the color CA of a texel TA which is nearest to the pixel P.

On the other hand, the color CP of the pixel P in the bi-linear filtering method is equal to a color obtained by interpolating the colors CA, CB, CC and CD of texels TA, TB, TC and TD which surround the pixel P.

More particularly, a coordinate ratio in the X-axis direction, $\beta$: $1-\beta (0 \leq \beta \leq 1)$, and a coordinate ratio in the Y-axis direction, $\gamma$: $1-\gamma (0 \leq \gamma \leq 1)$, are determined based on the coordinates of TA to TD and P.

In this case, the color CP of the pixel P (output color in the bi-linear filtering method) will be represented by the following formula:

$$CP = (1-\beta) \times (1-\gamma) \times CA + \beta \times (1-\gamma) \times CB + (1-\beta) \times \gamma \times CC + \beta \times \gamma \times CD \qquad (1)$$

This embodiment draws the edge line utilizing the bi-linear filtering method in which the color is automatically interpolated in such a manner.

More particularly, as shown in FIG. 13A, a mapping image is generated in which an object color is set in the inside area of the edge ED in the object OB while an edge line color is set in the outside area of the edge ED. This mapping image is set as a texture, as shown by F1 in FIG. 14. This texture is mapped on a virtual polygon (which is, in a broad sense, a virtual object) in the bi-linear filtering method, as shown by F2 in FIG. 14. At this time, texture coordinates given to the vertexes of the virtual polygon are shifted (or deviated or moved), for example, by (0.5, 0.5), in the lower-right direction.

Thus, the color of each of the pixels in the mapping image will automatically infiltrates into the surrounding pixels through the interpolation in the bi-linear filtering method. Therefore, the object color will be mixed with the edge line color in the vicinity of the edge of the object OB to draw the edge line EDL along the edge of the object OB, as shown in FIG. 13B.

According to the technique of this embodiment, the image of the edge line can be generated through the two-dimensional processing on the drawing region. Therefore, this embodiment does not require any three-dimensional processing such as a process of determining an angle included between the sight-line vector and the normal line. This can reduce the processing load on CPU.

According to the technique of this embodiment, the drawing procedure onto the drawing region only requires at least one drawing process (or at least two drawing processes) for the virtual polygon. This reduces the number of drawing processes necessary to generate the image of the edge line, thereby significantly reducing the processing load on the drawing processor.

It is now assumed that the vertexes VVX1, VVX2, VVX3 and VVX4 of a virtual polygon respectively have coordinates, (X, Y)=(X0, Y0), (X0, Y1), (X1, Y1) and (X1, Y0), respectively. If texture coordinates (U, V) given to the respective vertexes VVX1, VVX2, VVX3 and VVX4 of the virtual polygon are respectively set to (X0, Y0), (X0, Y1), (X1, Y1) and (X1, Y0), the position of each of the pixels will coincide with the position of the corresponding texel. Therefore, the color of each pixel will not infiltrate into the surrounding pixels.

On the contrary, if the texture coordinates (U, V) given to the respective vertexes VVX1, VVX2, VVX3 and VVX4 of the virtual polygon are respectively set to (X0+0.5, Y0+0.5), (X0+0.5, Y1+0.5), (X1+0.5, Y1+0.5) and (X1+0.5, Y0+0.5), the position of each pixel will be deviated from the position of the corresponding texel. Therefore, the color of each pixel will infiltrate into the surrounding pixels through the bi-linear filtering type interpolation.

More particularly, if the bi-linear filtering type texture mapping is carried out after the texture coordinates are shifted by 0.5 pixels (texels) in the lower-right direction, $\beta = \gamma = \frac{1}{2}$ in the above formula (1). If the colors of the texels T44, T45, T54 and T55 are respectively C44, C45, C54 and C55 in FIG. 15, therefore, the color CP44 of the pixel P44 is represented by the following formula:

$$CP44 = (C44 + C45 + C54 + C55)/4 \qquad (2)$$

Figure 15:
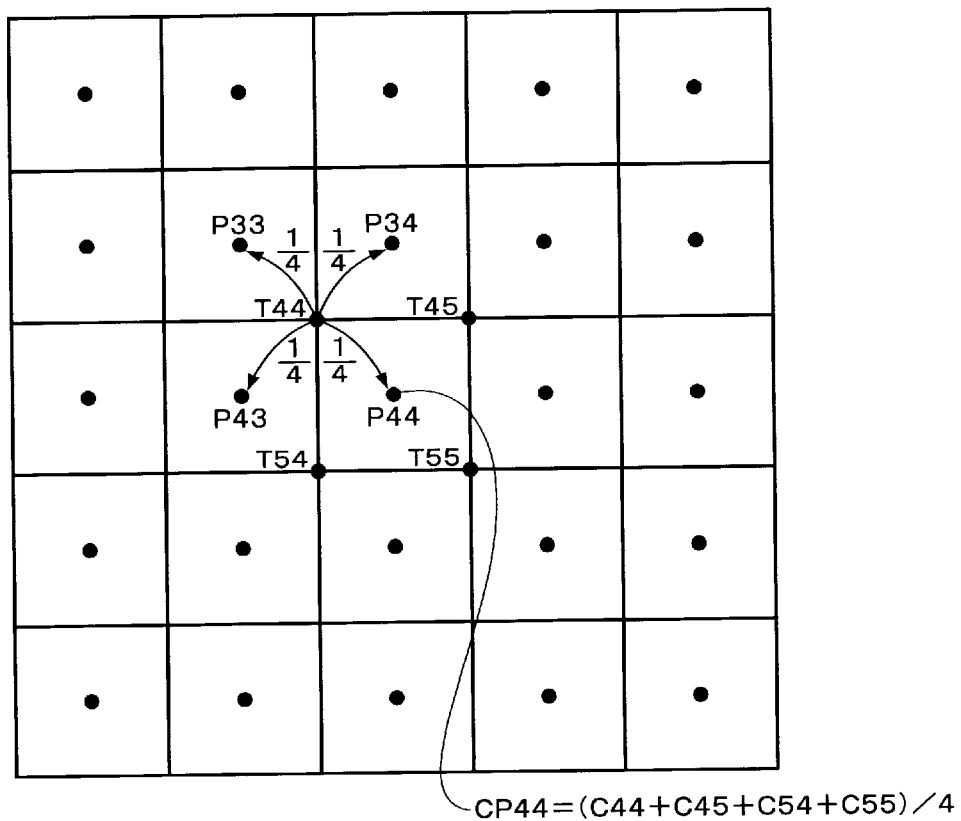
FIG. 15 illustrates the principle of a phenomenon in which the color of each pixel exudes into the surrounding region through the bi-linear filtering type interpolation.

If the bi-linear filtering type texture mapping is carried out while shifting the texture coordinates in the lower-right direction, the color C44 of the texel T44, that is, the original color of the pixel P44 will infiltrate into the pixels P33, P34, P43 and P44 by ¼, as shown in FIG. 15. Thus, such an image of the edge line EDL as shown in FIG. 13B can be generated to include the mixture of the edge line and object colors.

2.5 Generation of the Virtual Polygon

Figure 14:
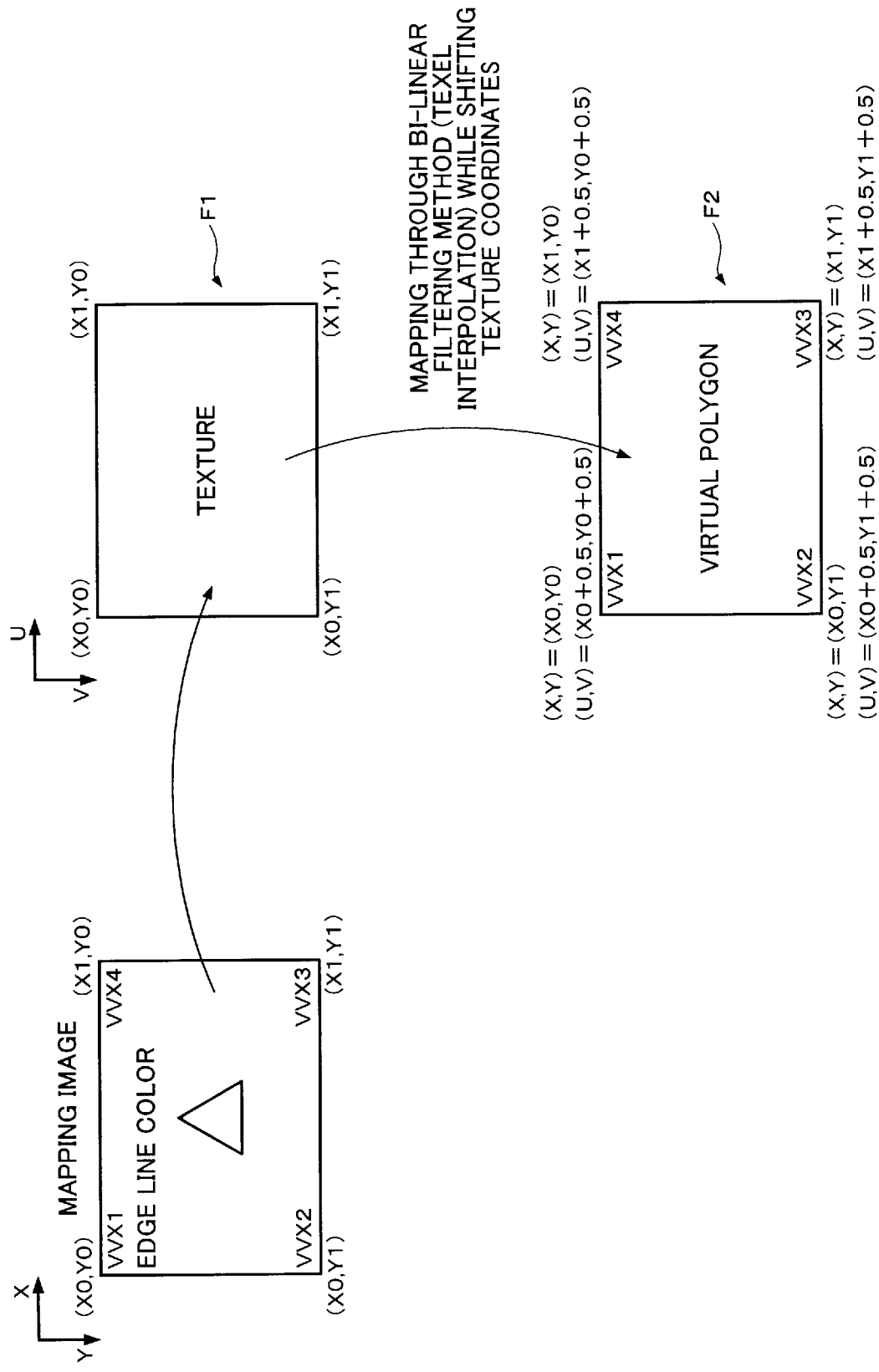
FIG. 14 illustrates a technique of generating the image of an edge line by effectively using the bi-linear filtering type texture mapping.

The virtual polygon to be mapped with the mapping image in FIG. 14 may take any of various forms.

If the virtual polygon is one having its size equal to the screen size, the bi-linear filtering type interpolation will be applied to the whole screen.

However, it has been found that when the virtual polygon having the screen size is used, a problem was raised in that the edge line cannot effectively be drawn.

In the three-dimensional game, the player's viewpoint is moved to an arbitrary position depending on the operational input from the player. The object representing the character or the like is also moved to an arbitrary position. Thus, the distance between the player's viewpoint and the object also varies. The size of the perspectively transformed object (or the screen area occupied by the object) will also vary depending on the distance between the viewpoint and the object.

If the distance between the viewpoint and the object OB is nearer as shown in FIG. 16A, the size of the perspectively transformed object OB increases (or the screen area occupied by the object increases).

On the other hand, if the distance between the viewpoint and the object OB is farther as shown in FIG. 16B, the size of the perspectively transformed object OB decreases (or the screen area occupied by the object decreases).

If the screen area occupied by the object OB is larger as shown in FIG. 16A, the processing will not be inefficient even though the virtual polygon to be mapped with the mapping image has its size equal to the screen size.

If the screen area occupied by the object OB is smaller as shown in FIG. 16B, however, a useless drawing process will be carried out when the polygon of the screen size is used. This unnecessarily increases the processing load.

To avoid such a problem, this embodiment generates a virtual polygon VPL of FIGS. 16A and 16B which encloses the image of the perspectively transformed object OB and which has its size variable depending on the size of the perspectively transformed object OB. The mapping image (see FIG. 13A) is then mapped on this virtual polygon VPL.

If the distance between the viewpoint and the object OB varies to change the screen area occupied by the object OB, the size of the virtual polygon VPL correspondingly varies. For example, as the distance between the viewpoint and the object OB increases, the size of the virtual polygon VPL decreases. Thus, the drawing process can effectively be carried out to optimize the load on the drawing process.

If the object is configured by object parts, a virtual polygon may be generated for each of the object parts. If part of the object (e.g., eye or mouth) is only to be processed, such a virtual polygon as enclosing part of the perspectively transformed object may be generated.

The technique of generating the virtual polygon may take any of various techniques.

The first technique generates the virtual polygon VPL based on the coordinates of the vertexes VX1 to VX6 (which are, in a broad sense, definition points including the control points of free-form surfaces) in the perspectively transformed object, as shown in FIGS. 17A and 17B.

More particularly, the virtual polygon VPL will be generated by determining the vertexes VVX1 (XMIN, YMIN), VVX2 (XMIN, YMAX), VVX3 (XMAX, YMAX) and VVX4 (XMAX, YMIN) of the virtual polygon VPL, based on the minimum values XMIN, YMIN and maximum values XMAX, YMAX of the X- and Y-coordinates in the vertexes of the object OB.

Since the first technique can optimally reduce the size of the virtual polygon VPL depending on the size of the perspectively transformed object OB, it is advantageous in that the load on drawing the virtual polygon VPL is reduced. On the other hand, it is disadvantageous in that if the vertexes in the object OB is much more, the load on determining the minimum and maximum X- and Y-coordinates in the respective vertexes increases.

Figure 18A:
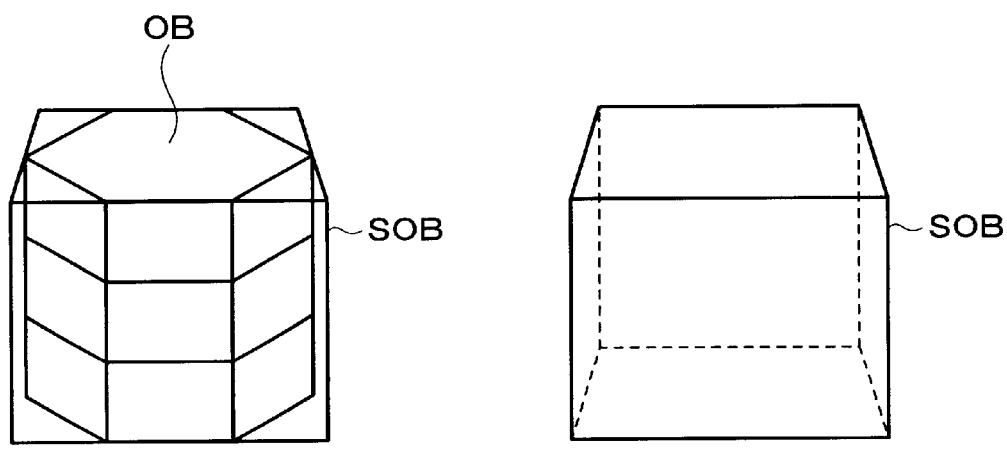
FIGS. 18A and 18B illustrate a technique of generating a virtual polygon based on the coordinates of vertexes in a perspectively-transformed simplified object.

The second technique uses a simplified object SOB (bounding box or bounding volume) which encloses the object OB, as shown in FIG. 18A. This simplified object SOB is used to perform hit checking or the like for the object OB. This embodiment effectively uses this simplified object SOB to generate the virtual polygon VPL based on the coordinates of the vertexes (which are, in a broad sense, definition points) in the simplified object SOB after the perspective transformation.

Figure 18B:
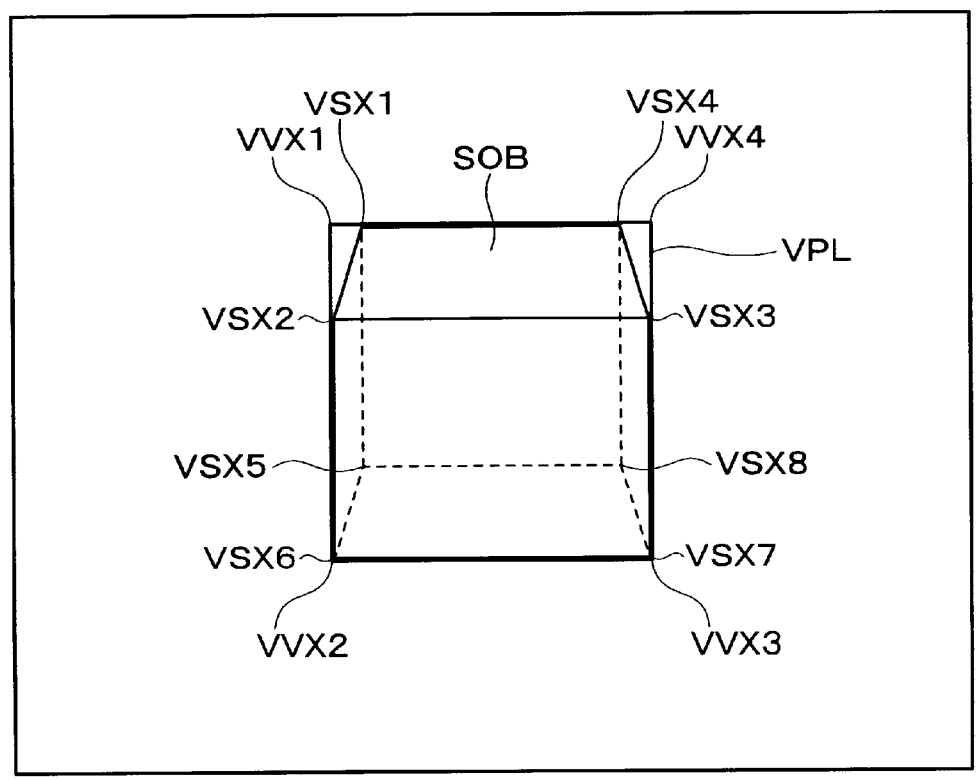

More particularly, the virtual polygon VPL is generated by determining the vertexes VVX1 to VVX4 of the virtual polygon VPL based on the minimum and maximum X- and Y-coordinates of the vertexes VSX1 to VSX8 in the perspectively-transformed simplified object SOB, as shown in FIG. 18B.

The second technique has an advantage in that since it uses the simplified object SOB having its vertexes less than those of the object OB, the minimum and maximum X- and Y-coordinates of the vertexes can be determined with reduced load. On the other hand, the second technique must generate the virtual polygon VPL having its size larger than that of the first technique. The second technique is thus disadvantageous in that the load on drawing the virtual polygon VPL increases in comparison with the first technique.

The size of the virtual polygon VPL may be slightly larger in the up/down and right/left directions than that of the virtual polygon VPL shown in FIGS. 17A, 17B and 18B (e.g., by one pixel).

The technique of changing the size of the virtual polygon VPL depending on the size of the perspectively transformed object is not limited to the aforementioned first and second techniques. For example, the size of the virtual polygon VPL may suitably be changed depending on the distance between the viewpoint and the object.

If the translucency of the edge line is to be changed depending on the size of the perspectively transformed object as described in connection with FIGS. 6 and 7B, the translucency of the edge line may be changed by determining and using the size (or number of pixels) of the virtual polygon (virtual object) which is generated through the technique described in connection with FIGS. 16A to 18B.

2.6 Image of Edge Line

The technique of generating the image of the edge line of the object will be described below.

This embodiment generates the image of the edge line using the bi-linear filtering type texture mapping process described in the above item 2.4.

2.6.1 Generation of Mapping Image

More particularly, the pre-procedure first initializes a work buffer (effect buffer) with the image information (RL, GL, BL, αL) of the edge line. Namely, the color of each pixel is set to the color of the edge line (RL, GL, BL) while the alpha value is set at αL (=0).

Next, an object OB to which the edge line thereof is to be added is drawn in the work buffer. At this time, the alpha value (A-value) in each of the vertexes of the object OB has been set at αJ (>0). For simplicity, it is assumed herein that the color of the object OB is a single color (RJ, GJ, BJ).

Figure 19:
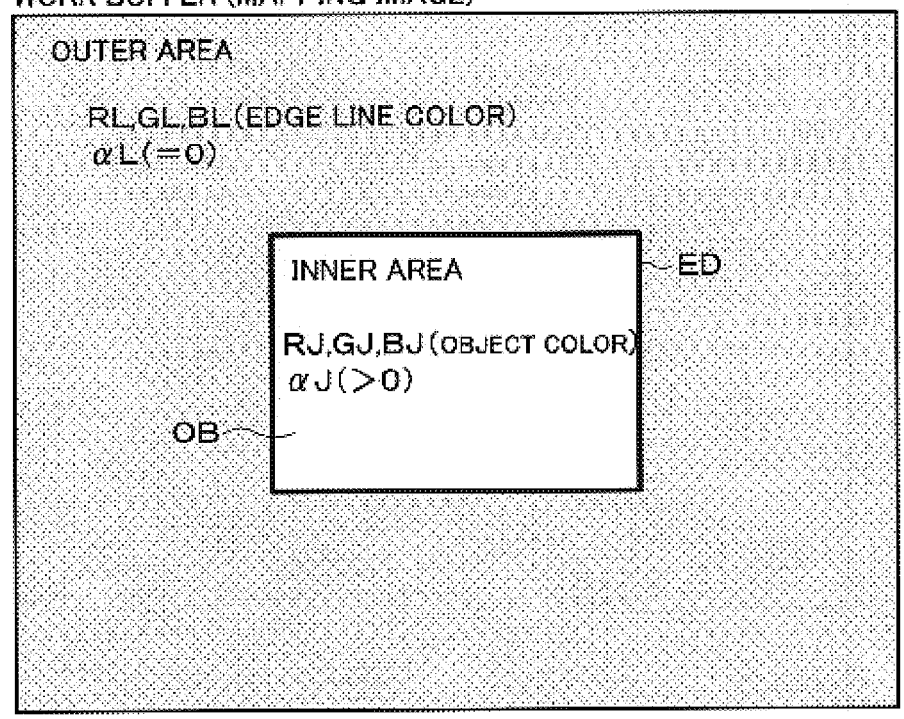
FIG. 19 shows a mapping image generated on a work buffer.

In such a situation, such an image as shown in FIG. 19 (mapping image) will be drawn in the work buffer.

In other words, the inside area of the edge ED in the object OB is set to the color (RJ, GJ, BJ) of the same object OB while the outside area of the edge ED is set to the color (RL, GL, BL) of the edge line. The alpha value in the inside area is set at αJ (>0) while the alpha value in the outside area is set at αL (=0).

The setting of alpha value shown in FIG. 19 is shown only for illustration, but it is essential that the alpha value in the outside area is necessarily different from that of the inside area.

2.6.2 Generation of Alpha (Mask) Plane

Only the alpha (mask) plane in the mapping image on the work buffer shown in FIG. 19 is then drawn on a frame buffer.

More particularly, a virtual polygon (which is, in a broad sense, a virtual object: VPL in FIGS. 16A to 18B) is drawn in the frame buffer such that the alpha (α) plane in the mapping image will only be drawn in the frame buffer, while mapping the mapping image on the work buffer onto the virtual polygon.

Figure 20:
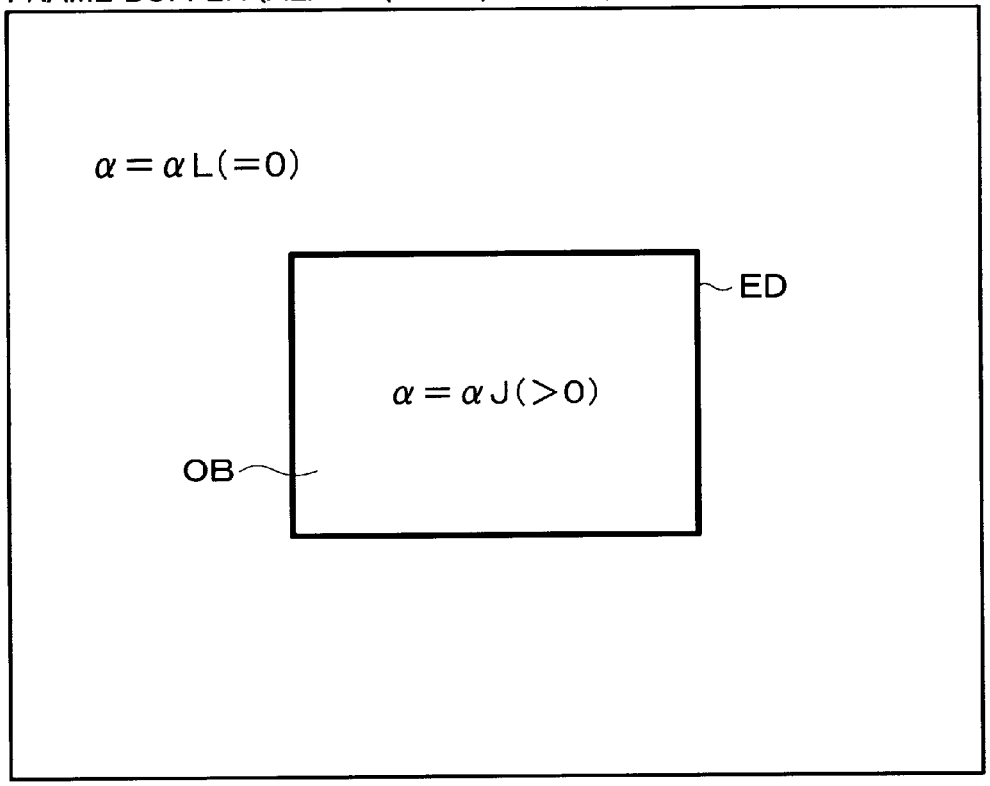
FIG. 20 shows an alpha (α) plane generated on a frame buffer.

In such a manner, the alpha (mask) plane will be generated on the frame buffer in which α=αJ (>0) is set in the inside area of the edge ED of the object OB while α=αL (=0) is set in the outside area, as shown in FIG. 20.

2.6.3 Drawing of Object Image

The image of the object OB is then drawn in the frame buffer. When the image of the object OB has previously been drawn in the frame buffer in this manner, the translucent-synthesizing (alpha blending) can be made between the object image and the edge line image.

More particularly, the virtual polygon is drawn in the frame buffer while mapping the mapping image on the work buffer onto the virtual polygon.

On performing this texture mapping:

(1) The drawing of the alpha plane is masked not to break the alpha plane drawn as in FIG. 20.

(2) Only a pixel of α=αJ is caused to pass in the source alpha (α) test.

Figure 21:
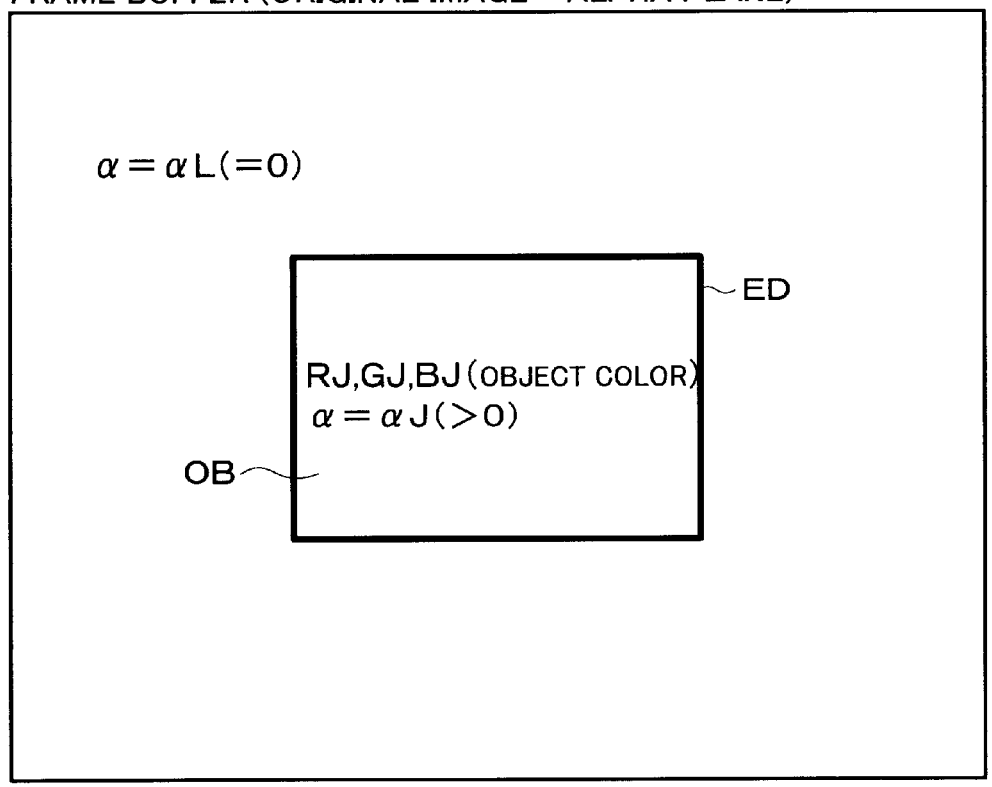
FIG. 21 shows an original object image and alpha plane generated on the frame buffer.

In such a manner, the image of the object OB (or original image) will be drawn in the frame buffer together with the alpha (α) plane generated as in FIG. 20, as shown in FIG. 21.

2.6.4 Texture Mapping in the Bi-linear Filtering Method

Next, the mapping image on the work buffer shown in FIG. 19 is drawn in the frame buffer at the same position.

More particularly, the virtual polygon (see FIGS. 16A to 18B) is drawn in the frame buffer while mapping the mapping image on the work buffer onto that virtual polygon, as shown in FIG. 22.

On performing this texture mapping:

(1) The bi-linear filtering method (texel interpolation) is selected;

(2) The texture coordinates are shifted (or deviated), for example, by +0.5 pixels (texels), as described in connection with FIG. 14;

(3) In the source alpha test (or alpha test for the mapping image which is a writing source), only a pixel having α<αJ is passed; and (4) In the destination alpha test (or alpha text for the image in the frame buffer which is a destination), only a pixel of α=αJ is passed.

Figure 23:
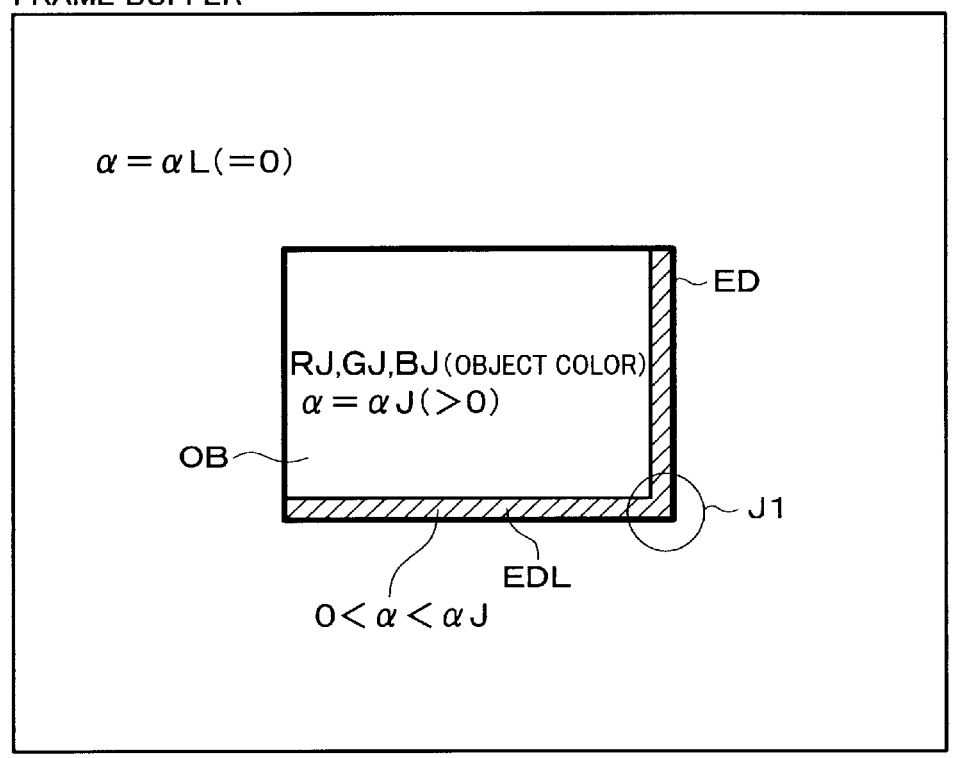
FIG. 23 shows an image generated on the frame buffer through the technique of FIG. 22.

Thus, such an image as shown in FIG. 23 is generated in which the edge line EDL is added to the right- and bottom-sides of the inside area in the object OB.

By selecting the bi-linear filter and also shifting the texture coordinates, the interpolation will be carried out for the color and alpha value (A-value) which are set to each of the pixels in the mapping image on the work buffer.

Figure 24:
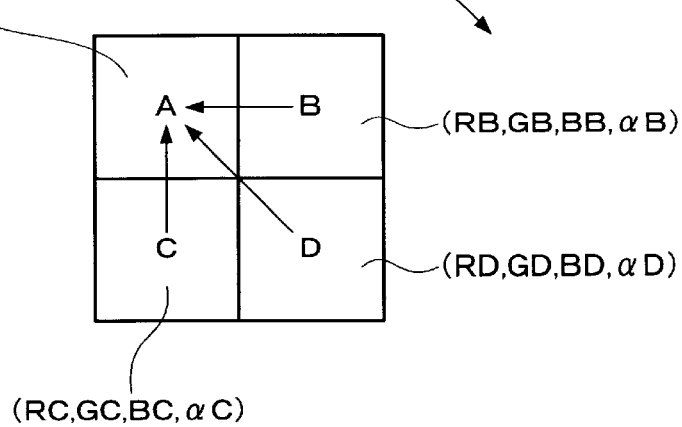
FIG. 24 illustrates a technique of interpolating RGB and alpha (α) value of a pixel through the bi-linear filtering method.

If it is now assumed that the texture coordinates (U, V) is shifted by +0.5 pixels (texels) and when the position of the drawn pixel is at (X, Y), the colors and alpha values at the positions of four pixels (X, Y), (X+1, Y), (X, Y+1) and (X+1, Y+1) will be referred to on texture sampling. As a result, the color and alpha value of the finally drawn texel will be equal to the respective averages of the colors and alpha values of the above four pixels. For example, if the texture coordinates are shifted in the lower-right direction as shown in FIG. 24, the RGBs and alpha values of the pixels B, C and D will infiltrate into a pixel A by ¼. This may be represented by the following formula:

$$R = (RA + RB + RC + RD)/4, \quad (3)$$

$$G = (GA + GB + GC + GD)/4,$$

$$B = (BA + BB + BC + BD)/4, \text{ and}$$

$$\alpha = (\alpha A + \alpha B + \alpha C + \alpha D)/4$$

In the above formula, R, G, B and α are respectively the colors and alpha value obtained through the interpolation (or the colors and alpha value of the interpolated pixel A). Furthermore, (RA, GA, BA, αA), (RB, GB, BB, αB), (RC, GC, BC, αC) and (RD, GD, BD, αD) are the colors and alpha values of the pixels A, B, C and D before interpolated, respectively.

Figure 25:
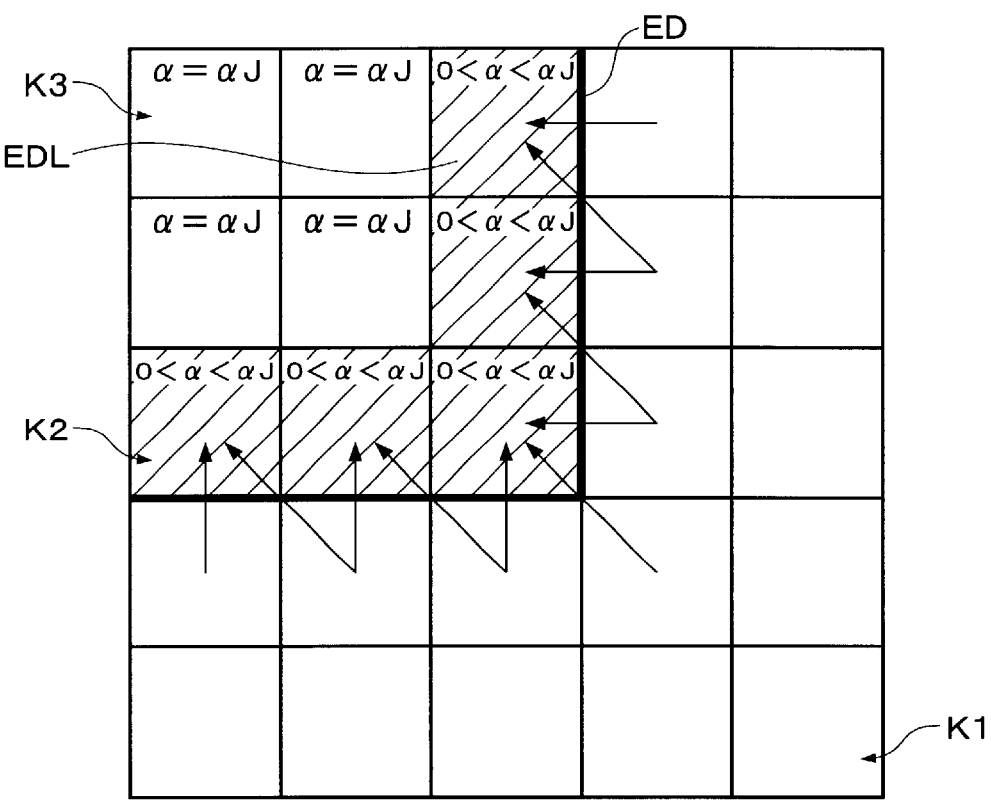
FIG. 25 illustrates a technique of generating the image of an object edge line.

As will be apparent from the foregoing, the RGBs and alpha values of the pixels B, C and D will infiltrate into the pixel A by ¼ by shifting the texture coordinates by 0.5 pixels in the lower-right direction. As a result, at a portion shown by J1 in FIG. 23, the color of the object OB (RJ, GJ, BJ) will be blended with the color of the edge line (RL, GL, BL) in the inside area of the edge ED to generate the image of the edge line EDL in the inside area of the edge ED, as shown in FIG. 25.

The color of this edge line (RL, GL, BL) is the color set to the outside area of the edge ED in the work buffer as shown in FIG. 19.

In this embodiment, the alpha value will also be subjected to the bi-linear filtering type interpolation in addition to the color. The alpha value set to the edge line EDL will thus be obtained by blending αJ in the object OB with αL in the edge line.

The above procedure will further be described in detail.

(I) Pixel Surrounded by Pixels to be Referred to, all of which are Colored with the Edge Line Color In such a pixel as shown by K1 in FIGS. 25, all the RGBs and alpha values of the surrounding pixels to be referred to are (RL, GL, BL, αL). In the aforementioned formula (3), therefore, (RA, GA, BA, αA)=(RB, GB, BB, αB)=(RC, GC, BC, αC)=(RD, GD, BD, αD)=(RL, GL, BL, αL). Thus, the RGB and alpha value after interpolated becomes (R, G, B, α)=(RL, GL, BL, αL).

Since α=αL=0 at this time (see FIG. 19), the source alpha test only passes a pixel of α<αJ. In the destination alpha test that only passes a pixel of α=αJ, however, any pixel existing in any region other than the region in which the image of the object OB has been drawn is not passed. Therefore, such a pixel as shown by K1 in FIG. 25 is inhibited to be drawn.

(II) Pixel to be Referred to in Respect with the Pixels of Both the Edge Line and Object Colors Such a pixel as shown by K2 in FIG. 25 are surrounded by pixels (texels) of (RL, GL, BL, αL) and pixels (texels) of (RJ, GJ, BJ, αJ). In such a case, if it is assumed that the number of pixels of (RJ, GJ, BJ, αJ) is K, (R, G, B, α) after interpolation through the above formula (3) are represented by the following formula:

$$R = \{RJ \times K + RL \times (4 - K)\}/4, \quad (4)$$
$$G = \{GJ \times K + GL \times (4 - K)\}/4,$$
$$B = \{BJ \times K + BL \times (4 - K)\}/4, \text{ and}$$
$$\alpha = \{\alpha J \times K + \alpha L \times (4 - K)\}/4$$

As will be apparent from the above formula (4), the color of the interpolated pixel will be colored with a color obtained by mixing the color (RJ, GJ, BJ, αJ) of the object OB with the color (RL, GL, BL, αL) of the edge line.

Since αJ>0, 1≦K≦3 and αL=0, 0<α<αJ. Therefore, the source alpha test only passes the pixels of α>αJ which will be drawn in the frame buffer.

By the destination alpha test that only passes the pixels of α=αJ, only the portions of the edge line image in the inside area of the object (along the right- and bottom-sides in FIG. 23) will be drawn in the frame buffer.

(III) Pixel Surrounded by Pixels to be Referred to are Colored with the Object Color In such a pixel as shown by K3 in FIG. 25, all the RGBs and alpha values of the surrounding pixels to be referred to are (RJ, GJ, BJ, αJ). In the aforementioned formula (3), therefore, (RA, GA, BA, αA)=(RB, GB, BB, αB)=(RC, GC, BC, αC)=(RD, GD, BD, αD)=(RJ, GJ, BJ, αJ). Thus, the RGB and alpha value after interpolated becomes (R, G, B, α)=(RJ, GJ, BJ, αJ).

Since α=αJ at this time (see FIG. 19), these pixels are not passed by the source alpha test, which only passes the pixels of α<αJ, and the drawing of these pixels are inhibited.

In such a manner, such an image as shown in FIG. 23 can be drawn in the frame buffer.

2.6.5 Drawing of Left and Top Edge Lines

The mapping image on the work buffer shown in FIG. 19 is then drawn in the frame buffer by mapping the mapping image on the virtual object while shifting the texture coordinates in the direction opposite to that of the aforementioned item 2.6.4.

More particularly, as shown in FIG. 26, (1) The bi-linear filtering method is selected;

(2) The texture coordinates (U, V) are shifted (or deviated) by (-0.5, -0.5) in the direction opposite to that of the aforementioned 2.6.4;

(3) only the pixels of α<αJ are passed in the source alpha test; and (4) only the pixels of α=αJ are passed in the destination alpha test.

Figure 27:
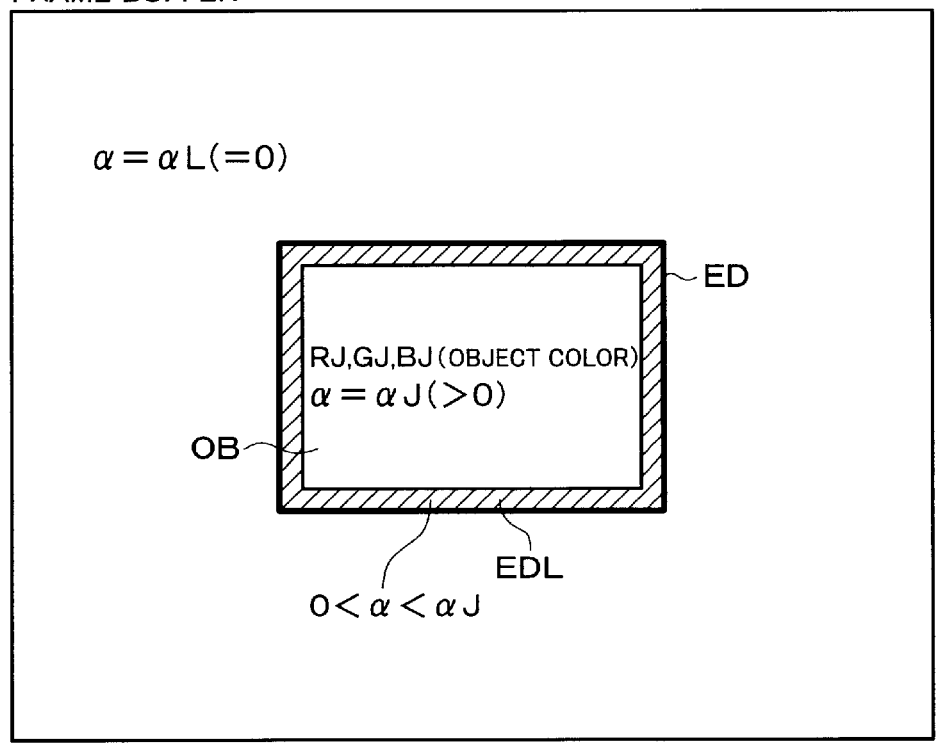
FIG. 27 shows a final image generated on the frame buffer through the technique of FIG. 26.

Thus, the edge line EDL is applied to the left and top sides of the inside area of the object OB. As shown in FIG. 27, therefore, an image will be generated in which the edge line EDL is drawn in the inside area of the edge ED of the object OB.

3. Procedure of this Embodiment

The details of a procedure according to this embodiment will be described in connection with flowcharts shown in FIGS. 28 to 32.

Figure 28:
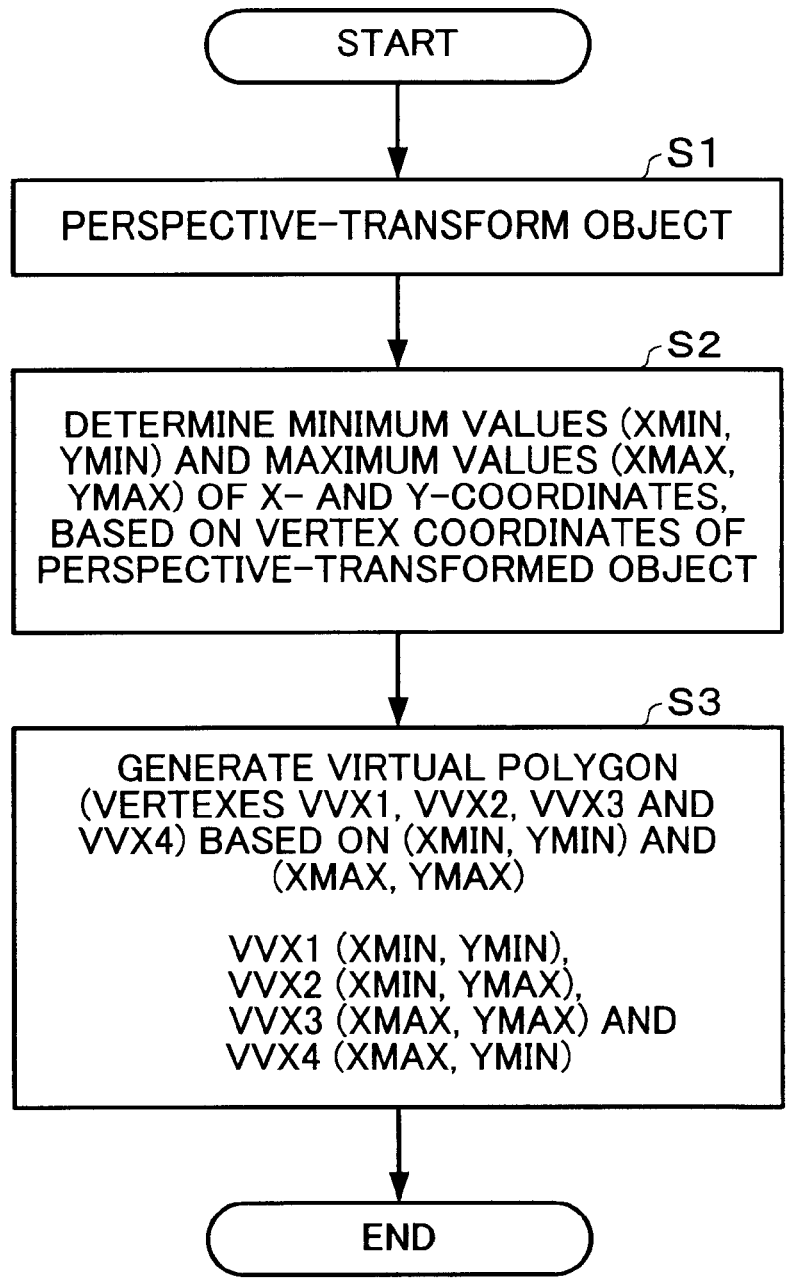
FIG. 28 is a flowchart illustrating the details of the process according to this embodiment.

FIG. 28 shows a flowchart illustrating the process of generating a virtual polygon onto which a mapping image is to be mapped.

First of all, the geometry-processing is carried out relative to an object to perspectively transform (or affine-transformed) it into the screen (step S1).

Next, the minimum and maximum values XMIN, YMIN and XMAX, YMAX in the X- and Y-coordinates of the object vertexes are determined based on the vertex coordinates of the perspectively transformed object (step S2).

Next, based on the determined (XMIN, YMIN) and (XMAX, YMAX), a virtual polygon enclosing the image of the object OB is generated as described in connection with FIGS. 17A and 17B (step S3). In this case, the vertexes VVX1 to VVX4 of the virtual polygon are as follows:

VVX1 (XMIN, YMIN),
VVX2 (XMIN, YMAX),
VVX3 (XMAX, YMAX), and
VVX4 (XMAX, YMIN).

The size of the virtual polygon (image effect region) may slightly be enlarged in the up/down and right/left directions. More particularly, if it is assumed that the minimum values of the X- and Y-coordinates are XMIN, YMIN and that the maximum values thereof are XMAX, YMAX, each of the minimum values XMIN, YMIN is subtracted by one pixel to determine XMIN'=XMIN-1, YMIN'=YMIN-1. At the same time, each of the maximum values XMAX, YMAX is added by one pixel to determine XMAX'=XMAX+1, YMAX'=YMAX+1. These determined minimum and maximum values (XMIN', YMIN') and (XMAX', YMAX') are used to determine the vertexes VVX1 to VVX4 of the virtual polygon.

Figure 29:
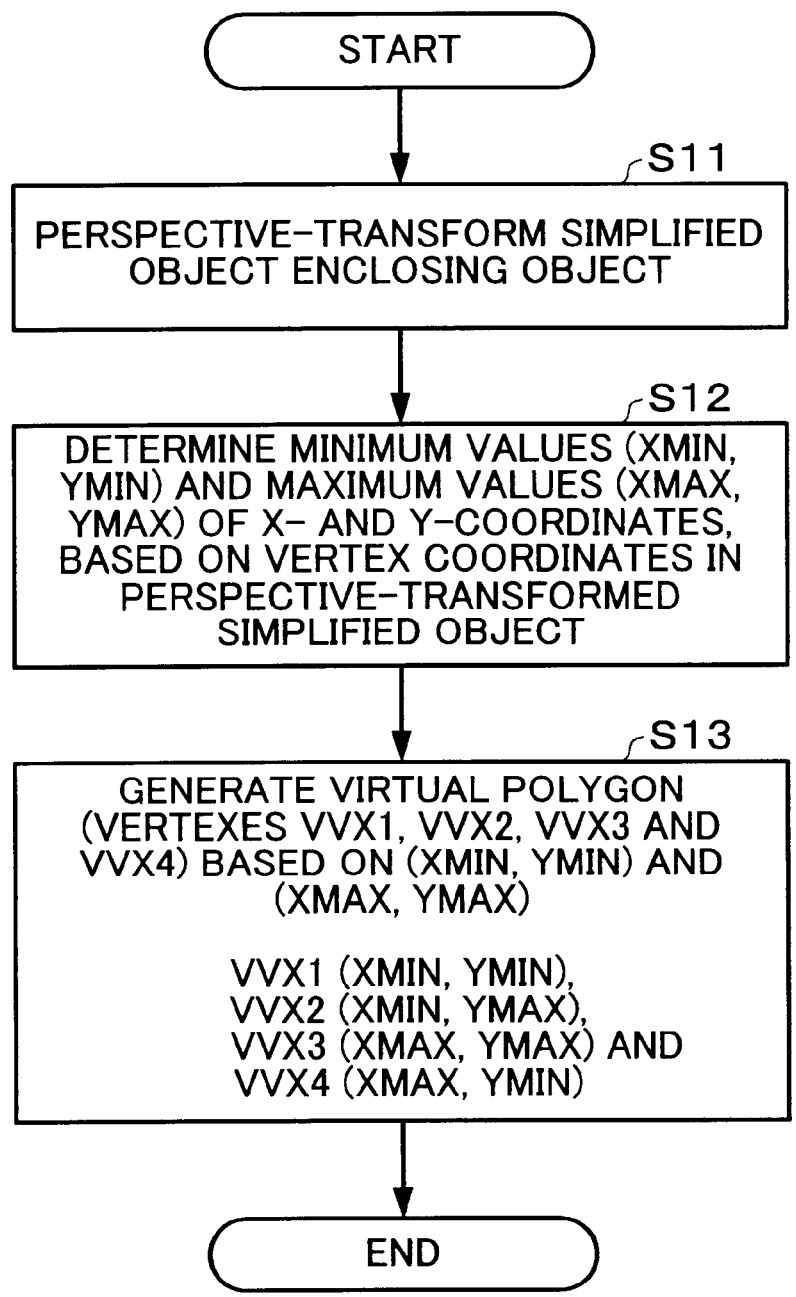
FIG. 29 is a flowchart illustrating the details of the process according to this embodiment.

FIG. 29 shows a flowchart illustrating the process of generating the virtual polygon using the simplified object of the object as described in connection with FIGS. 18A and 18B.

FIG. 29 is different from FIG. 28 only in that the perspective transformation is performed relative to the simplified object at step S11 and that the values (XMIN, YMIN) and (XMAX, YMAX) are determined based on the coordinates of the vertexes in the perspectively-transformed simplified object at step S12. The other steps are similar to those of FIG. 28.

Figure 30:
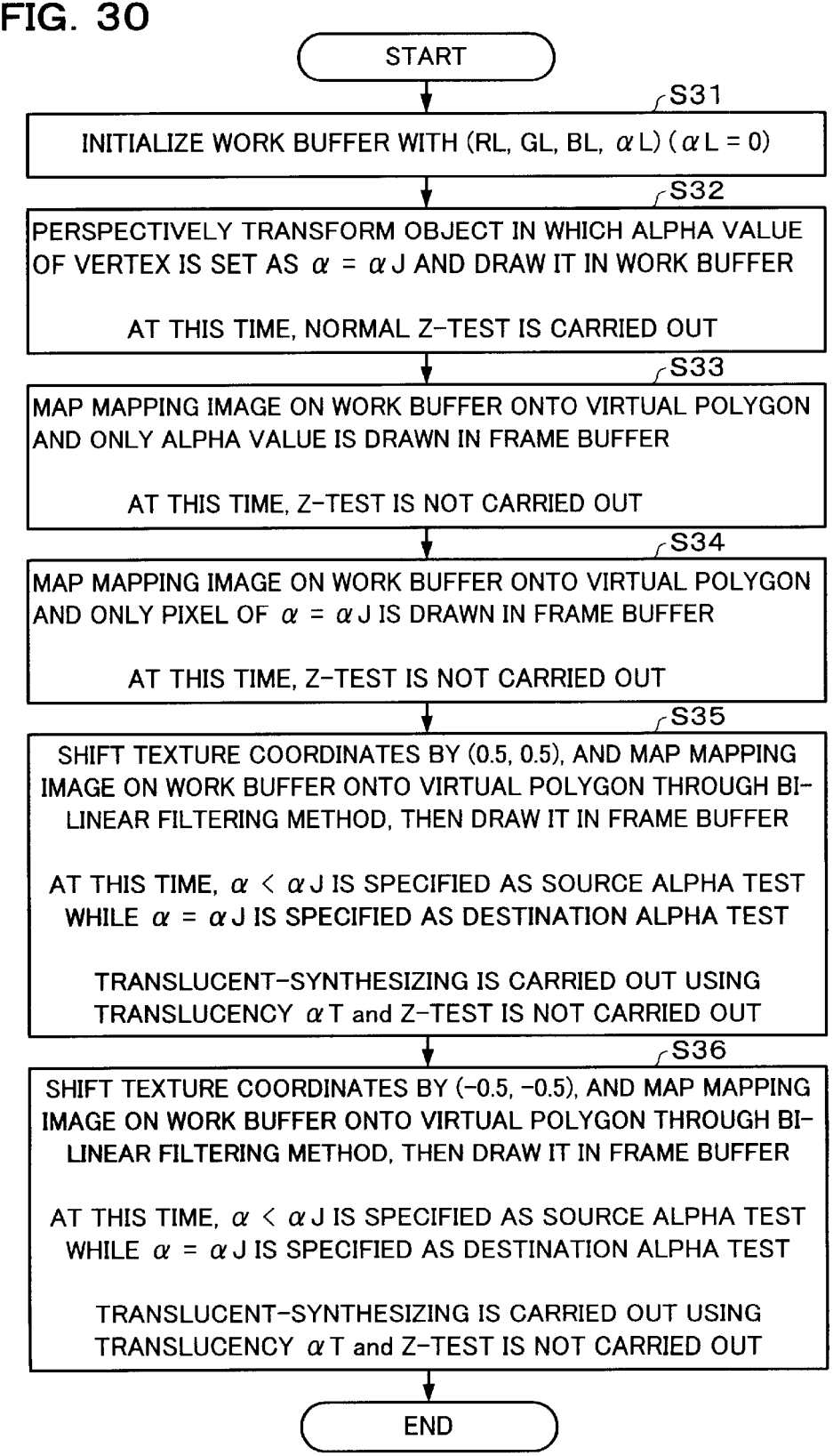
FIG. 30 is a flowchart illustrating the details of the process according to this embodiment.

FIG. 30 shows a flowchart illustrating the process of adding the edge line to the object.

First of all, the work buffer is initialized with the image of the edge line (RL, GL, BL, αL) as described in connection with FIG. 19 (step S31).

Next, the object having its vertex alpha value set to α=αJ is subjected to the perspective transformation and drawn in the work buffer (step S32). At this time, the hidden-surface removal will be performed by the Z-test using the normal Z-buffer. Thus, the Z-value of the object in the edge-line drawing position can be set as that of the edge line, as described in connection with FIG. 9.

Next, as described in connection with FIG. 20, only the alpha value is drawn in the frame buffer by mapping the mapping image on the work buffer onto the virtual polygon (step S33).

Next, as described in connection with FIG. 21, only the pixels of α=αJ are drawn in the frame buffer by mapping the mapping image on the work buffer onto the virtual polygon (step S34). Thus, the original image of the object will be drawn in the frame buffer.

Next, as described in connection with FIG. 22, the virtual polygon is drawn in the frame buffer by mapping the mapping image on the work buffer onto the virtual polygon through the bi-linear filtering method while shifting the texture coordinates (U, V) by (0.5, 0.5) (step S35). At this time, α<αJ is specified for the source alpha test while α=αJ is specified for the destination alpha test. Moreover, the translucent-synthesizing of the object image with the edge line image will be carried out using the transparency αT set by a given register or the like.

Next, as described in connection with FIG. 26, the virtual polygon is drawn in the frame buffer by mapping the mapping image on the work buffer onto the virtual polygon through the bi-linear filtering method while shifting the texture coordinates (U, V) by (−0.5, −0.5) (step S36). At this time, α<αJ is specified for the source alpha test while α=αJ is specified for the destination alpha test. Moreover, the translucent-synthesizing of the object image with the edge line image will be carried out using the transparency αT set by a given register or the like.

The steps S33 to S36 in FIG. 30 will not perform the Z-test.

In such a manner, such an image as shown in FIG. 27 can be drawn in which the edge line is drawn in the inside area of the object.

As will be apparent from the foregoing, one of the features of this embodiment is that the alpha value in the inside area of the edge ED of the object OB is set to be different from the alpha value in the outside area (FIG. 19) and that various detections are carried out based on the alpha values interpolated through the bi-linear filtering method in addition to the colors. In other words, the interpolated alpha values are used to detect (discriminate) the region of edge line (or the region of 0<α<αJ) in the inside area of the edge of the object OB, thereby drawing the edge line image in this region. This enables the edge line EDL of the object OB to be generated with reduced processing load.

Figure 31:
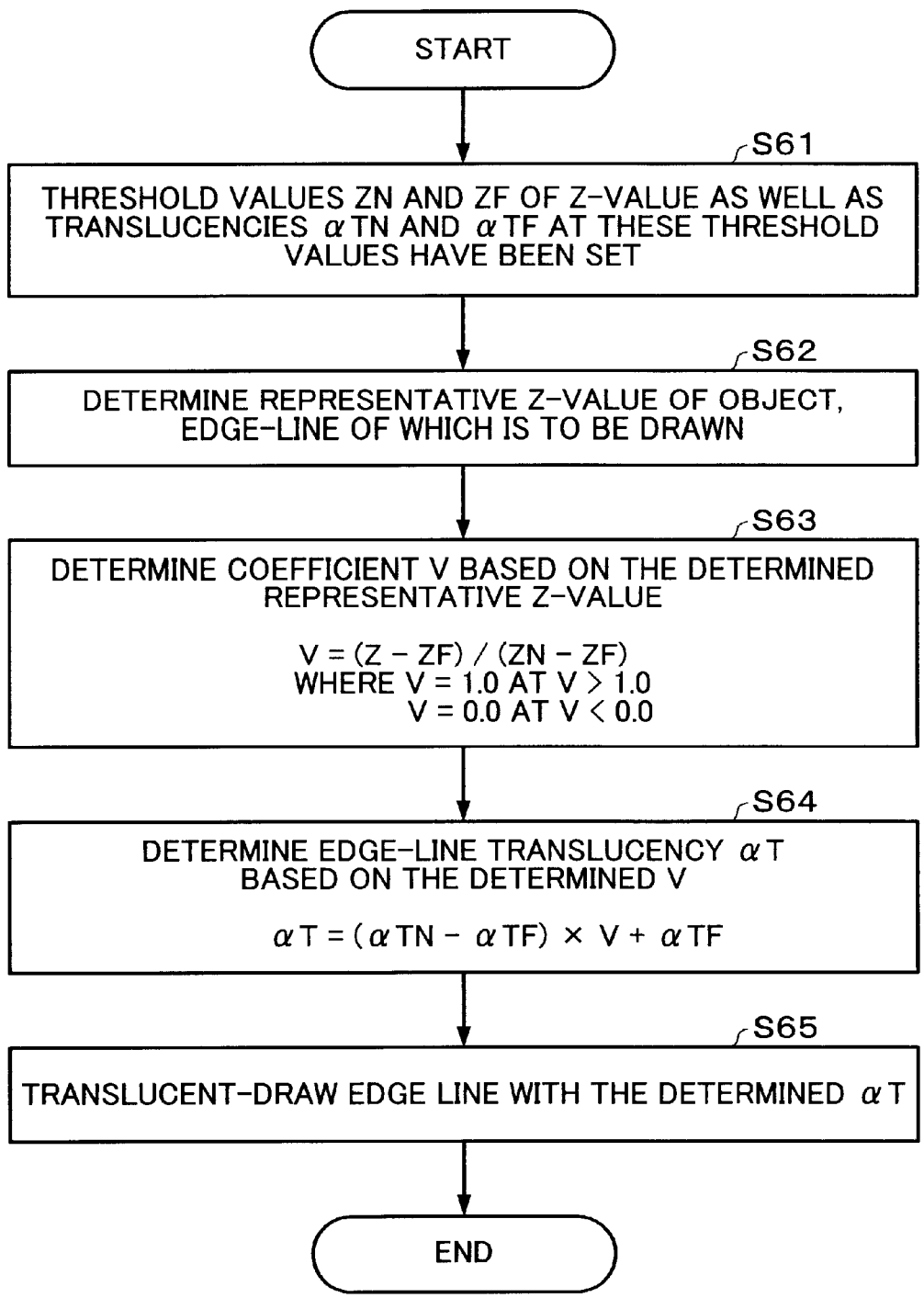
FIG. 31 is a flowchart illustrating the details of the process according to this embodiment.

FIG. 31 shows a flowchart illustrating the process of changing the transparency of the edge line depending on the distance (Z-value). The Z-value increases as it approaches the viewpoint.

First of all, the threshold values ZN, ZF of the Z-value (which correspond to VTN, VTF in FIG. 7A) as well as the transparencies αTN, αTF at those threshold values have previously been set (step S61).

Next, the representative Z-value of the object, the edge line of which is to be drawn (Z-value at the representative point) is determined (step S62).

Next, the determined representative Z-value is used to determine a coefficient V for determining the transparency as shown by the following formula (step S63).

$$V=(Z-ZF)/(ZN-ZF)$$

In the above formula, however, V=1.0 when V>1.0. V=0.0 when V<0.0.

Next, the determined coefficient V is used to determine the transparency αT of the edge line as shown by the following formula (step S64).

$$αT=(αTN-αTF) \times V+αTF$$

Next, the determined transparency αT is used to translucent-draw the edge line (step S65). The procedure of this step S65 corresponds to the translucent-synthesizing process in the steps S35 and S36 of FIG. 30.

Figure 32:
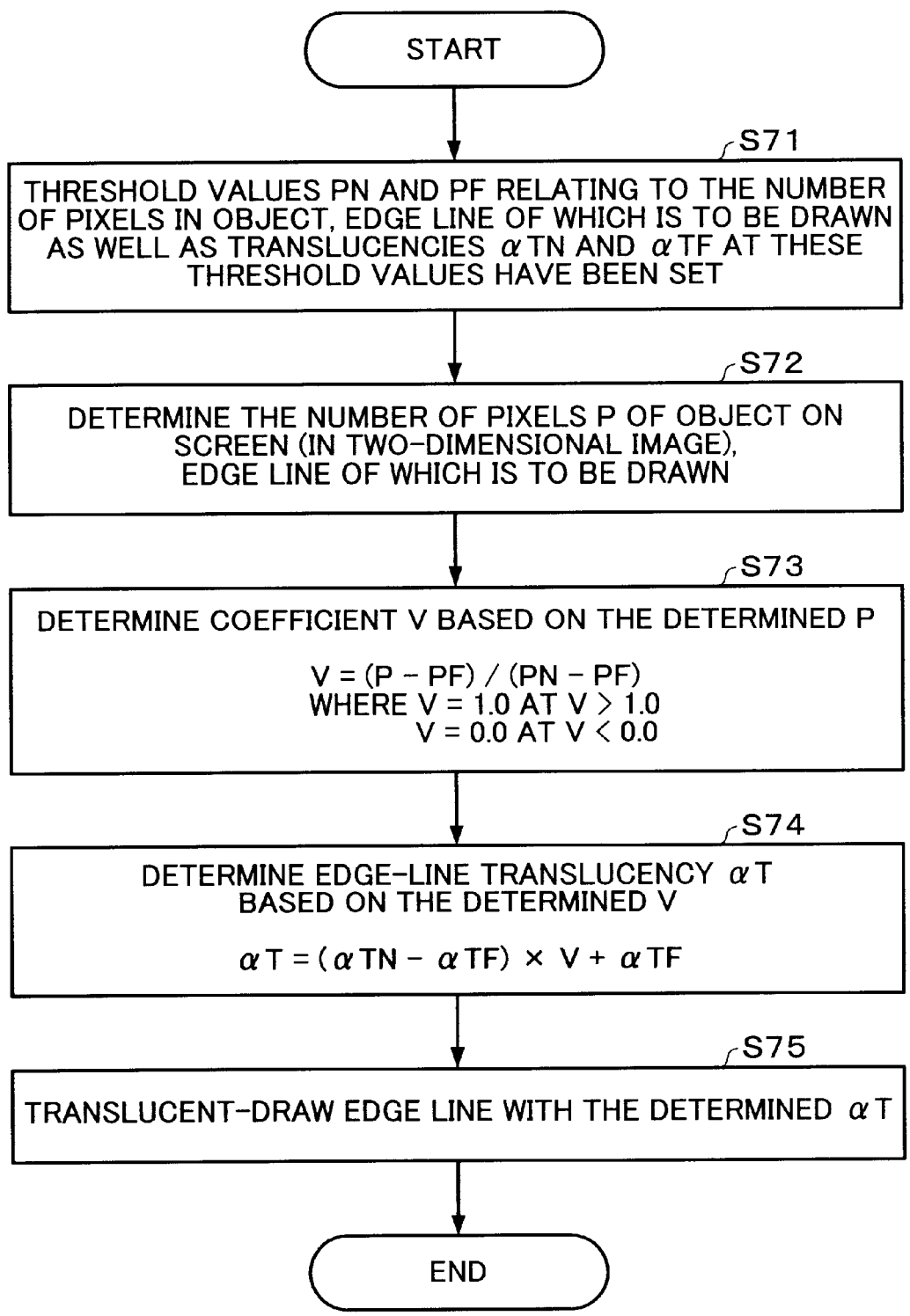
FIG. 32 is a flowchart illustrating the details of the process according to this embodiment.

FIG. 32 shows a flowchart illustrating the process of changing the translucency of the edge line depending on the size of the object (number of pixels).

First of all, the threshold values PN, PF in the size of the object, the edge line of which is to be drawn (which correspond to VTN, VTF in FIG. 7B) as well as the transparency αTN, αTF corresponding to these threshold values have previously been set (step S71).

Next, the number of pixels P (in two-dimensional image) of the object, the edge line of which is to be drawn on the screen, that is, the number of longitudinal pixels×the number of transverse pixels) is determined (step S72).

Next, the determined number of pixels P is used to determine the coefficient V for determining the translucency as shown by the following formula (step S73).

$$V=(P-PF)/(PN-PF)$$

In the above formula, however, V=1.0 when V>1.0. V=0.0 when V<0.0.

Next, the determined coefficient V is used to determine the transparency αT of the edge line (step S74). The determined transparency αT is then used to translucent-draw the edge line (step S75). The procedure in this step S75 corresponds to the translucent-synthesizing procedure in the steps S35 and S36 of FIG. 30.

4. Hardware Configuration

Figure 33:
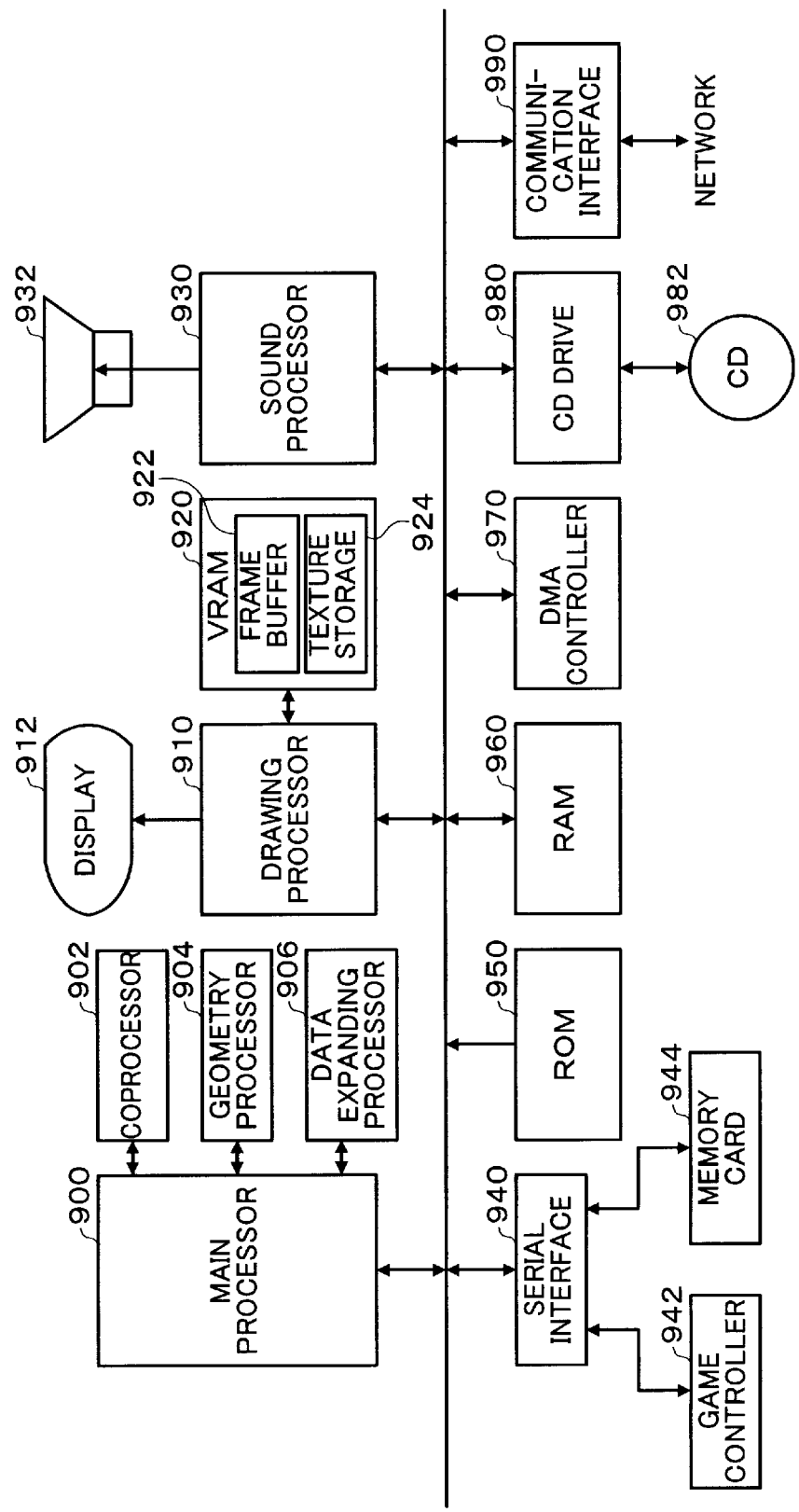
FIG. 33 is a hardware structure which can realize this embodiment.

A hardware arrangement which can realize this embodiment is shown in FIG. 33.

A main processor 900 operates to execute various processings such as game processing, image processing, sound processing and other processings according to a program stored in a CD (information storage medium) 982, a program transferred through a communication interface 990 or a program stored in a ROM (one information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 is to perform a geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 is to perform a decoding process for expanding image and sound compressed data or a process for accelerating the decoding process in the main processor 900. In the opening, intermission, ending or game scene, thus, an MPEG compressed animation image may be displayed. The image and sound data to be decoded may be stored in the storage devices including ROM 950 and CD 982 or may externally be transferred through the communication interface 990.

A drawing processor 910 is to draw or render an object configured by primitive surfaces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing a hidden-surface removal by the use of a Z-buffer or the like, based on the object data and texture. The drawing processor 910 can also perform alpha blending (or translucency processing), mip-mapping, fogging, bi-linear filtering, tri-linear filtering, anti-aliasing, shading and so on. As the image for one frame is written into the frame buffer 922, that image is displayed on a display 912.

A sound processor 930 includes any multi-channel ADPCM sound source or the like to generate high-quality game sounds such as BGMs, sound effects and voices. The generated game sounds are outputted from a speaker 932.

The operational data from a game controller 942, saved data from a memory card 944 and personal data may externally be transferred through a serial interface 940.

ROM 950 has stored a system program and soon. For an arcade game system, the ROM 950 functions as an information storage medium in which various programs have been stored. The ROM 950 may be replaced by any suitable hard disk.

RAM 960 is used as a working area for various processors.

The DMA controller 970 controls the transfer of DMA between the processors and memories (such as RAMs, VRAMs, ROMs or the like).

CD drive 980 drives a CD 982 (information storage medium) in which the programs, image data or sound data have been stored and enables these programs and data to be accessed.

The communication interface 990 is to perform data transfer between the image generating system and any external instrument through a network. In such a case, the network connectable with the communication interface 990 may take any of communication lines (analog phone line or ISDN) or high-speed serial interface bus. The use of the communication line enables the data transfer to be performed through the INTERNET. If the high-speed serial interface bus is used, the data transfer may be carried out between the image generating system and any other game system.

All the means of the present invention may be executed only through hardware or only through a program which has been stored in an information storage medium or which is distributed through the communication interface. Alternatively, they may be executed both through the hardware and program.

If all the means of the present invention are executed through both the hardware and program, the information storage medium will have stored a program (and data) for executing the means of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 34A:
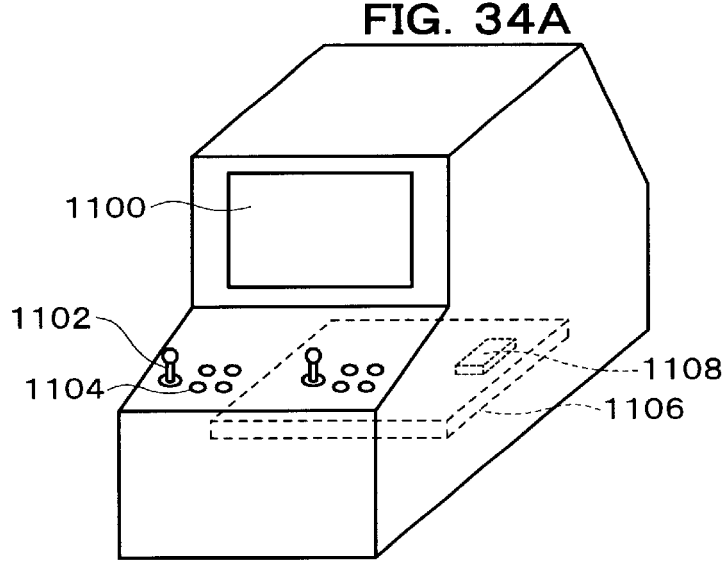
FIGS. 34A, 34B and 34C show various system forms to which this embodiment can be applied.

FIG. 34A shows an arcade game system to which this embodiment is applied. Players enjoy a game by controlling levers 1102 and buttons 1104 while viewing a game scene displayed on a display 1100. A system board (circuit board) 1106 included in the game system includes various processor and memories which are mounted thereon. Information (program or data) for executing all the means of the present invention has been stored in a memory 1108 on the system board 1106, which is an information storage medium. Such information will be referred to "stored information" later.

Figure 34B:
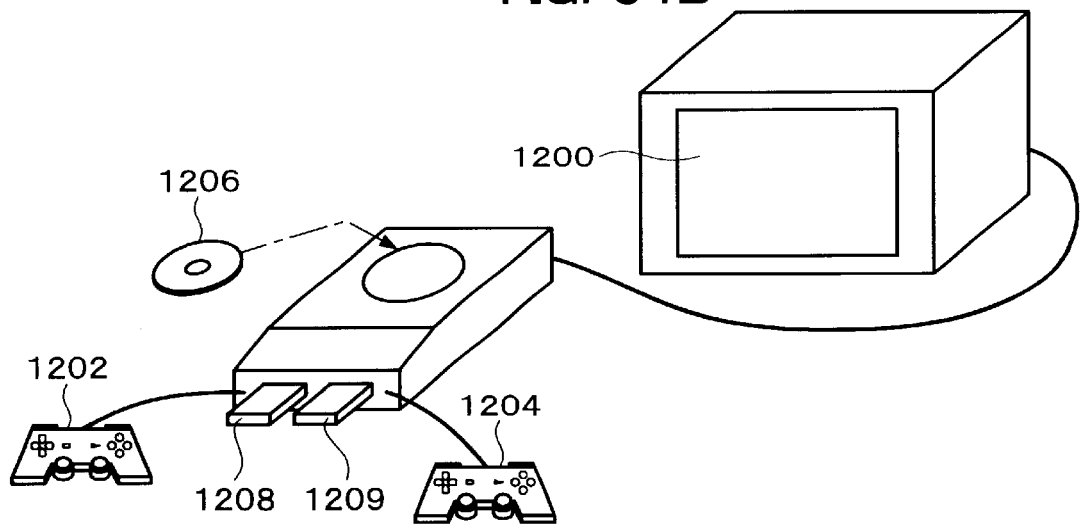

FIG. 34B shows a domestic game apparatus to which this embodiment is applied. A player enjoys a game by manipulating game controllers 1202 and 1204 while viewing a game picture displayed on a display 1200. In such a case, the aforementioned stored information pieces have been stored in CD 1206 or memory cards 1208, 1209 which are detachable information storage media in the game system body.

Figure 34C:
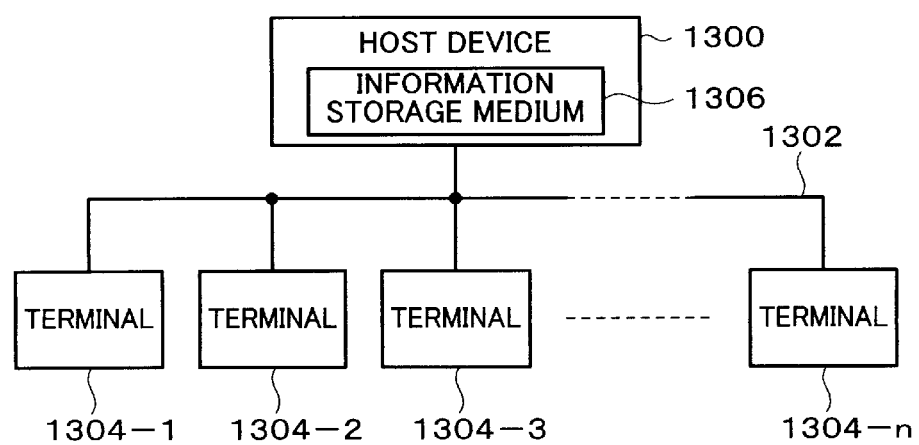

FIG. 34C shows an example wherein this embodiment is applied to a game system which includes a host device 1300 and terminals 1304-1 to 1304-n connected to the host device 1300 through a network (which is a small-scale network such as LAN or a global network such as INTERNET) 1302. In such a case, the above stored information pieces have been stored in an information storage medium 1306 such as magnetic disk device, magnetic tape device, memory or the like which can be controlled by the host device 1300, for example. If each of the terminals 1304-1 to 1304-n is designed to generate game images and game sounds in a stand-alone manner, the host device 1300 delivers the game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 34C, the means of the present invention may be decentralized into the host device (or server) and terminals. The above information pieces for realizing the respective means of the present invention may be distributed and stored into the information storage media of the host device (or server) and terminals.

Each of the terminals connected to the network may be either of domestic or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the domestic game systems.

The present invention is not limited to the things described in connection with the above forms, but maybe carried out in any of various other forms.

For example, the invention relating to one of the dependent claims may not contain part of the structural requirements in any claim to which the one dependent claim belongs. The primary part of the invention defined by one of the independent claim may belong to any other independent claim.

It is particularly desirable that the technique of drawing the edge line in the inside area of the edge of the object is the texel interpolation type texture mapping technique. However, the present invention is not limited to such a technique.

The object for generating the image of the edge line is not necessarily displayed. A case where the object is not displayed and the image of the edge line is only displayed also falls in the scope of the present invention. In such a case, a three-dimensional image such as a character drawn only by an edge line and others can be generated. This provides an effect of picture which would not be provided by the prior art.

The texel interpolation type texture mapping process is desirably in the bi-linear filtering method, but not limited to such a method.

It is particularly that the technique of generating the virtual polygon is one described in connection with FIGS. 16A to 18B. However, the present invention is not limited to such a technique, but may be carried out in any of various other techniques.

It is particularly that the detection of the edge line region and so on in the object is carried out based on the texel interpolated alpha values. However, the present invention is not limited to such a form, but may be carried out in any of various other forms.

The characteristic of the function between the distance between the object and the viewpoint or the size of the object and the transparency of the edge line may take any of various other forms. For example, the characteristic of the function may be a curve characteristic of the multi-dimensional function, rather than such a linear characteristic as shown in FIGS. 7A and 7B. In other words, the values between (VTN, αTN) and (VTF, αTF) maybe interpolated through a multi-dimensional function, rather than the linear interpolation.

Figure 35A:
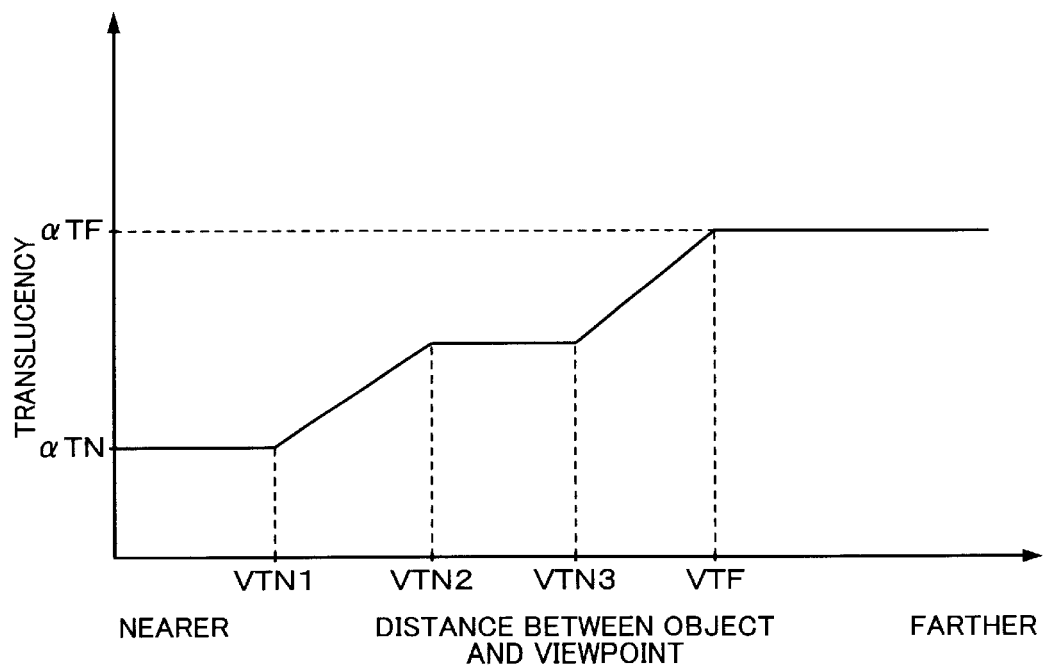
FIGS. 35A and 35B shows another characteristic of a function between the distance between the object and the viewpoint, the size of the perspectively transformed object and the translucency of the edge line.
Figure 35B:
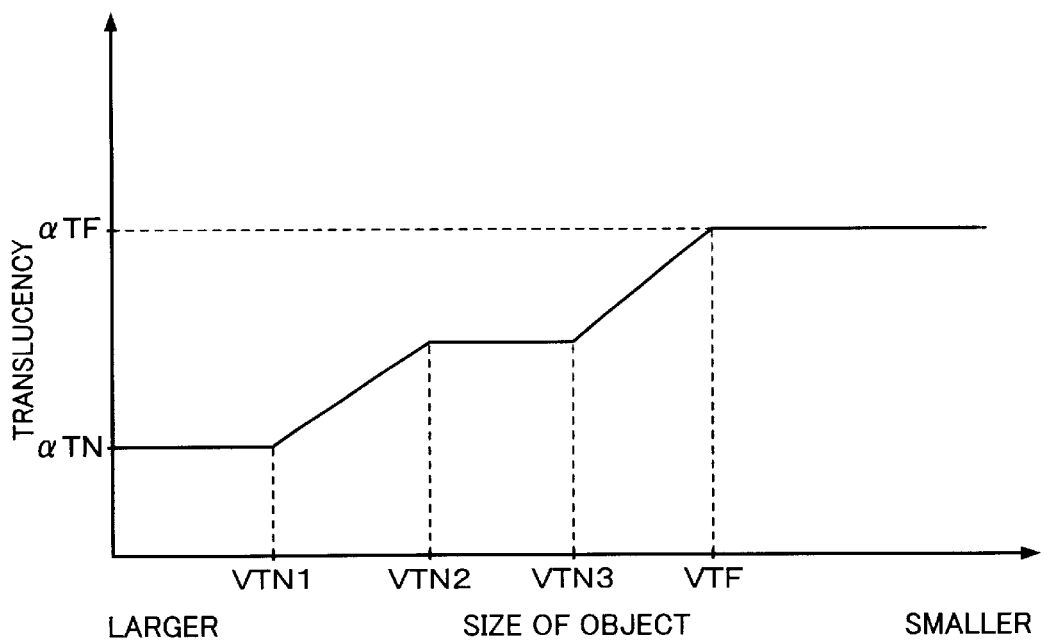

The number of threshold values may be four or more as shown in FIGS. 35A and 35B. The number of threshold values is arbitrary. Alternatively, no threshold value may be set. If the distance between the object and the viewpoint or the size of the perspectively transformed object is within the range of VTN2 to VTN3 as shown in FIGS. 35A and B, the transparency of the edge line may be maintained substantially constant, as described in connection with FIG. 8A.

The present invention may be applied to any of various games such as fighting games, shooting games, robot combat games, sports games, competitive games, roll-playing games, music playing games, dancing games and so on.

Furthermore, the present invention can be applied to various game systems (image generating systems) such as arcade game systems, domestic game systems, large-scaled multi-player attraction systems, simulators, multimedia terminals, image generating systems, game image generating system boards and so on.

What is claim is:

1. A game system which generates an image, comprising:
a memory which stores a program and data for image generating; and
at least one processor which is connected to the memory and performs processing for image generating,
the processor performing processing of:
drawing an image of an edge line of an object in an inside area of an edge of the object, the image of the edge line being generated based on an image of the object; and
generating an image as viewed from a given viewpoint within an object space,
wherein the image of the object is translucent-synthesized with the image of the edge line of the object based on a translucency determined depending on a distance from the viewpoint or a size of the object that has been perspectively transformed.

2. The game system according to claim 1,
wherein a Z-value of the object in a position where the edge line thereof is to be drawn is set as the Z-value of the edge line.

3. The game system according to claim 1,
wherein after the object has been drawn in a drawing region, the image of the edge line is drawn in the inside area of the edge of the object that has been drawn in the drawing region.

4. A game system which generates an image, comprising:
a memory which stores a program and data for image generating; and
at least one processor which is connected to the memory and performs processing for image generating,
the processor performing processing of:
drawing an image of an edge line of an object in an inside area of an edge of the object, the image of the edge line being generated based on an image of the object; and
generating an image as viewed from a given viewpoint within an object space,
wherein the image of the edge line of the object is generated by generating a mapping image including color information of the object set in the inside area of the edge of the object and the color information of the edge line set in the outside area of the edge of the object, texture-mapping the generated mapping image onto a virtual object through a texel interpolation while shifting a texture coordinate in a first direction, and then mapping the mapping image onto the virtual object though the texel interpolation while shifting the texture coordinate in a second direction.

5. The game system according to claim 4,
wherein the mapping image is generated by drawing the object that has been perspectively transformed in a drawing region where a background to which the color information of the edge line is set is drawn.

6. The game system according to claim 4,
wherein the virtual object encloses whole or part of the object that has been perspectively transformed, and has a size variable depending on a size of the perspectively transformed object.

7. The game system according to claim 6,
wherein the virtual object is generated based on a coordinate of a definition point of the perspectively transformed object.

8. The game system according to claim 6,
wherein when a simplified object is set relative to the object, the virtual object is generated based on the coordinate of a definition point of the simplified object that has been perspectively transformed.

9. The game system according to claim 4,
wherein an alpha value set in the inside area of the edge of the object is different from an alpha value set in the outside area of the edge of the object, and
wherein an edge line region in the inside area of the edge of the object is detected based on an alpha value that has been subjected to the texel interpolation.

10. A computer-usable program embodied on an information storage medium or in a carrier wave, comprising a processing routine for causing a computer to perform processing of:
drawing an image of an edge line of an object in an inside area of an edge of the object, the image of the edge line being generated based on an image of the object; and
generating an image as viewed from a given viewpoint within an object spacer,
wherein the image of the object is translucent-synthesized with the image of the edge line of the object based on a translucency determined depending on a distance from the viewpoint or a size of the object that has been perspectively transformed.

11. The program according to claim 10,
wherein a Z-value of the object in a position where the edge line thereof is to be drawn is set as the Z-value of the edge line.

12. The program according to claim 10,
wherein after the object has been drawn in a drawing region, the image of the edge line is drawn in the inside area of the edge of the object that has been drawn in the drawing region.

13. A computer-usable program embodied on an information storage medium or in a carrier wave, comprising a processing routine for causing a computer to perform processing of:

drawing an image of an edge line of an object in an inside area of an edge of the object, the image of the edge line being generated based on an image of the object; and generating an image as viewed from a given viewpoint within an object space, wherein the image of the edge line of the object is generated by generating a mapping image including color information of the object set in the inside area of the edge of the object and the color information of the edge line set in the outside area of the edge of the object, texture-mapping the generated mapping image onto a virtual object through a texel interpolation while shifting a texture coordinate in a first direction, and then mapping the mapping image onto the virtual object through the texel interpolation while shifting the texture coordinate in a second direction.

14. The program according to claim 13, wherein the mapping image is generated by drawing the object that has been perspectively transformed in a drawing region where a background to which the color information of the edge line is set is drawn.

15. The program according to claim 13, wherein the virtual object encloses whole or part of the object that has been perspectively transformed, and has a size variable depending on a size of the perspectively transformed object.

16. The program according to claim 15, wherein the virtual object is generated based on a coordinate of a definition point of the perspectively transformed object.

17. The program according to claim 15, wherein when a simplified object is set relative to the object, the virtual object is generated based on the coordinate of a definition point of the simplified object that has been perspectively transformed.

18. The program according to claim 13, wherein an alpha value set in the inside area of the edge of the object is different from an alpha value set in the outside area of the edge of the object, and wherein an edge line region in the inside area of the edge of the object is detected based on an alpha value that has been subjected to the texel interpolation.

19. An image generating method of generating an image, comprising:

drawing an image of an edge line of an object in an inside area of an edge of the object, the image of the edge line being generated based on an image of the object; and generating an image as viewed from a given viewpoint within an object space, wherein the image of the object is translucent-synthesized with the image of the edge line of the object based on a translucency determined depending on a distance from the viewpoint or a size of the object that has been perspectively transformed.

20. The image generating method according to claim 19, wherein a Z-value of the object in a position where the edge line thereof is to be drawn is set as the Z-value of the edge line.

21. The image generating method according to claim 19, wherein after the object has been drawn in a drawing region, the image of the edge line is drawn in the inside area of the edge of the object that has been drawn in the drawing region.

22. An image generating method of generating an image, comprising:

drawing an image of an edge line of an object in an inside area of an edge of the object, the image of the edge line being generated based on an image of the object; and generating an image as viewed from a given viewpoint within an object space, wherein the image of the edge line of the object is generated by generating a mapping image including color information of the object set in the inside area of the edge of the object and the color information of the edge line set in the outside area of the edge of the object, texture-mapping the generated mapping image onto a virtual object through a texel interpolation while shifting a texture coordinate in a first direction, and then mapping the mapping image onto the virtual object through the texel interpolation while shifting the texture coordinate in a second direction.

23. The image generating method according to claim 22, wherein the mapping image is generated by drawing the object that has been perspectively transformed in a drawing region where a background to which the color information of the edge line is set is drawn.

24. The image generating method according to claim 22, wherein the virtual object encloses whole or part of the object that has been perspectively transformed, and has a size variable depending on a size of the perspectively transformed object.

25. The image generating method according to claim 24, wherein the virtual object is generated based on a coordinate of a definition point of the perspectively transformed object.

26. The image generating method according to claim 24, wherein when a simplified object is set relative to the object, the virtual object is generated based on the coordinate of a definition point of the simplified object that has been perspectively transformed.

27. The image generating method according to claim 22, wherein an alpha value set in the inside area of the edge of the object is different from an alpha value set in the outside area of the edge of the object, and wherein an edge line region in the inside area of the edge of the object is detected based on an alpha value that has been subjected to the texel interpolation.

* * * * *